(12) United States Patent
Bai et al.

(10) Patent No.: US 11,661,017 B2
(45) Date of Patent: May 30, 2023

(54) ACTUATOR FOR ADJUSTING DISPLAY TERMINAL, AND VEHICLE

(71) Applicant: BYD COMPANY LIMITED, Guangdong (CN)

(72) Inventors: Sheng Bai, Shenzhen (CN); Xiaoru Zhang, Shenzhen (CN); Chao Cui, Shenzhen (CN); Xiaowen Wang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 341 days.

(21) Appl. No.: 16/968,851

(22) PCT Filed: Jan. 30, 2019

(86) PCT No.: PCT/CN2019/074019
§ 371 (c)(1),
(2) Date: Aug. 10, 2020

(87) PCT Pub. No.: WO2019/154234
PCT Pub. Date: Aug. 15, 2019

(65) Prior Publication Data
US 2021/0016720 A1  Jan. 21, 2021

(30) Foreign Application Priority Data

Feb. 11, 2018 (CN) .......................... 201810142922.4
Feb. 11, 2018 (CN) .......................... 201820253677.X

(51) Int. Cl.
*B60R 11/02* (2006.01)
*F16D 11/14* (2006.01)
(Continued)

(52) U.S. Cl.
CPC .......... *B60R 11/0235* (2013.01); *F16D 11/14* (2013.01); *F16H 1/203* (2013.01);
(Continued)

(58) Field of Classification Search
CPC ............ B60R 11/0229; B60R 11/0235; B60R 2011/0066; B60R 2011/007;
(Continued)

(56) References Cited

U.S. PATENT DOCUMENTS

| 5,636,071 A * | 6/1997 | Mochizuki | F16H 1/225 359/872 |
| 6,022,113 A * | 2/2000 | Stolpe | B60R 1/074 359/872 |
| 7,445,190 B2 * | 11/2008 | Brouwer | B60R 1/074 359/877 |
| 7,490,796 B2 * | 2/2009 | Kim | F16M 11/105 248/292.12 |
| 7,963,488 B2 * | 6/2011 | Hasegawa | F16M 11/105 248/920 |

(Continued)

FOREIGN PATENT DOCUMENTS

| CN | 106740542 A | 5/2017 |
| CN | 107235012 A | 10/2017 |

(Continued)

OTHER PUBLICATIONS

Search Report for International Application No. PCT/CN2019/074019 dated Apr. 17, 2019.

*Primary Examiner* — Christopher Garft
*Assistant Examiner* — Michael McDuffie
(74) *Attorney, Agent, or Firm* — Calfee Halter & Griswold LLP

(57) ABSTRACT

An actuator for adjusting a display terminal and a vehicle are provided. The actuator includes: a mounting unit configured to mount a display terminal; a clutch unit, a first engaging portion of the clutch unit being connected to the mounting unit, and a second engaging portion of the clutch unit being normally interlocked with the first engaging portion; and a (Continued)

drive unit, an output end of the drive unit being connected to the second engaging portion.

17 Claims, 17 Drawing Sheets

(51) Int. Cl.
*F16H 1/20* (2006.01)
*F16H 57/02* (2012.01)
*F16H 57/039* (2012.01)
*F16M 11/10* (2006.01)
*F16M 11/18* (2006.01)
*F16M 13/02* (2006.01)
*B60R 11/00* (2006.01)

(52) U.S. Cl.
CPC ............ *F16H 57/02* (2013.01); *F16H 57/039* (2013.01); *F16M 11/105* (2013.01); *F16M 11/18* (2013.01); *F16M 13/022* (2013.01); *B60R 2011/0066* (2013.01); *B60R 2011/0071* (2013.01); *B60R 2011/0092* (2013.01)

(58) Field of Classification Search
CPC ............ B60R 2011/0092; F16D 11/14; F16H 1/203; F16H 57/02; F16H 57/039; F16M 11/105; F16M 11/18; F16M 13/022
USPC ............ 248/292.12, 297.51, 479, 475.1, 476, 248/274.1, 291.1, 919, 920
See application file for complete search history.

(56) References Cited

U.S. PATENT DOCUMENTS

| | | | | |
|---|---|---|---|---|
| 7,966,904 | B2* | 6/2011 | Krueger | B60R 1/074 |
| | | | | 74/440 |
| 8,496,098 | B1* | 7/2013 | Napau | B60N 2/168 |
| | | | | 248/292.12 |
| 8,870,137 | B2* | 10/2014 | Jacobson | F16M 13/02 |
| | | | | 248/222.51 |
| 9,067,541 | B2 | 6/2015 | Sobecki | |
| 11,262,019 | B2* | 3/2022 | Woo | H04M 1/04 |
| 11,427,135 | B2* | 8/2022 | Luo | B60K 35/00 |
| 2007/0205341 | A1* | 9/2007 | Chih | F16M 11/18 |
| | | | | 248/920 |
| 2014/0110544 | A1* | 4/2014 | Chang | F16M 11/043 |
| | | | | 248/207 |
| 2015/0189991 | A1* | 7/2015 | Yang | F16M 11/24 |
| | | | | 248/292.12 |

FOREIGN PATENT DOCUMENTS

| | | |
|---|---|---|
| CN | 107344530 A | 11/2017 |
| CN | 107539366 A | 1/2018 |
| DE | 102006021249 B3 | 10/2007 |
| RU | 2601991 C2 | 11/2016 |

* cited by examiner

ACTUATOR FOR ADJUSTING DISPLAY TERMINAL, AND VEHICLE

CROSS-REFERENCE TO RELATED APPLICATIONS

This application is the National Stage of International Application No. PCT/CN2019/074019, filed on Jan. 30, 2019, which claims to the priority of Chinese Patent No "201810142922.4" and "201820253677.X" filed by the BYD Co., Ltd. on Feb. 11, 2018 and entitled "ACTUATOR FOR ADJUSTING DISPLAY TERMINAL, AND VEHICLE". The entire contents of the above-referenced applications are incorporated herein by reference.

FIELD

The present disclosure belongs to the technical field of display terminal adjustment, and in particular, to an actuator for adjusting a display terminal and a vehicle having the actuator.

BACKGROUND

With increasing requirements on modern vehicles for entertainment and intelligence and increasing popularity of mobile devices, in-vehicle multimedia have increasingly rich functions and forms. Multifunctional large-size in-vehicle display terminals that can be connected to mobile phones, computers, or the Internet become a mainstream trend in future development. However, currently, most of the in-vehicle display terminals are directly connected to a dashboard in a single mode of a landscape mode or a portrait mode. In this form, neither equal-scale and full-screen displaying of different specifications of image resources such as pictures and videos can be achieved, nor personal usage habits of different users can be satisfied.

Because structures of a manual mechanism and an electric mechanism cannot be integrated, in the prior art, in order to resolve the above technical problems, a pure manual mechanism or a pure electric mechanism is developed to rotate an in-vehicle display terminal. The mechanisms not only have complex structures, but also cannot satisfy manual or electric operation habits. In addition, because the in-vehicle display terminal is not fixed, the in-vehicle display terminal is very likely to shake with vibration of a whole vehicle, and therefore needs to be improved.

SUMMARY

The present disclosure is intended to resolve at least one of technical problems existing in the prior art. To this end, the present disclosure proposes an actuator for adjusting a display terminal. The actuator has manual and automatic adjustment functions, and the two adjustment manners do not interfere with each other.

The present disclosure further proposes a vehicle with the actuator.

An actuator for adjusting a display terminal according to an embodiment of a first aspect of the present disclosure includes: a mounting unit configured to mount a display terminal; a clutch unit, a first engaging portion of the clutch unit being connected to the mounting unit, and a second engaging portion of the clutch unit being normally interlocked with the first engaging portion; and a drive unit, an output end of the drive unit being connected to the second engaging portion.

According to the actuator for adjusting a display terminal in this embodiment of the present disclosure, a display terminal to be rotated manually and a display terminal to rotate automatically are coupled as a whole through the clutch unit, and the two screen switching methods do not interfere with each other.

A vehicle according to an embodiment of a second aspect of the present disclosure includes a display terminal and the above actuator according to the present disclosure. The actuator is mounted on a vehicle body, and the display terminal is mounted on the mounting unit of the actuator.

The vehicle according to the present disclosure has the same advantages as the above actuator compared to the prior art, and therefore details are not described herein again.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and easy to understand from the description of the embodiments with reference to the following accompanying drawings, where.

REFERENCE NUMERALS

Figure 1:
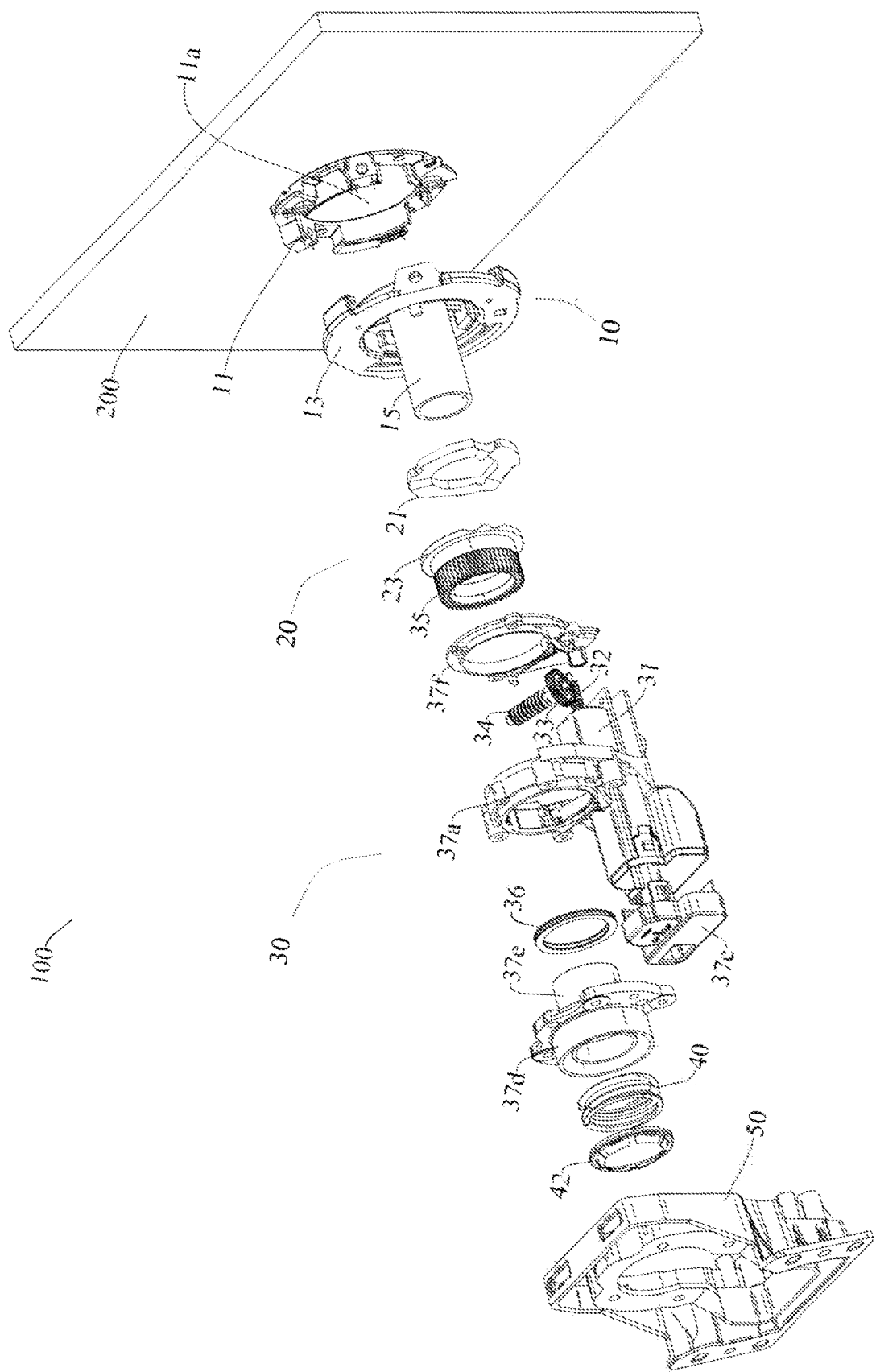
FIG. 1 is an exploded view of an actuator according to an embodiment of the present disclosure.

Vehicle 1000,
Actuator 100,
Mounting unit 10, Mounting bracket 11, Cavity 11a, Rotating turntable 13, First groove 13a, Second groove 13b, Limiting slot 14, Mounting shaft 15,
Clutch unit 20, First engaging portion 21, Second engaging portion 23, Oil groove 24, Engaging pad 28, Connecting sleeve 26, Locking slot 25, Locking protrusion 27,
Drive unit 30, Power source 31, First-stage driving worm 32, First-stage driven spur gear 33, Second-stage driving worm 34, Second-stage driven spur gear 35, Gear end bearing 36, Housing body 37a, Rear housing cover 37c, Upper housing cover 37d, Sleeve 37e, Front housing cover 37f, Axial limiting portion 37g, Partition 37h, Avoidance hole 37j, First cavity 37k, Second cavity 37m, Shaft sleeve 37n, limiting ring 37p, Limiting stop 38,
Elastic member 40, Elastic member end bearing 41, Axial limiting member 42,
Base 50, Radial holding mechanism 301, Outer ring 301a, Inner ring 301b, Display terminal 200.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationships shown based on the accompanying drawings, and are used only for ease of describing the present disclosure and simplifying the description, rather than indicating or implying that the apparatus or element should have a particular orientation or be constructed and operated in a particular orientation, and therefore, should not be construed as a limitation on the present disclosure. In addition, a feature defined to be "first" or "second" may explicitly or implicitly include one or more features. In the description of the present disclosure, unless stated otherwise, the meaning of "a plurality of" is two or more than two.

In the description of the present disclosure, it should be noted that unless otherwise explicitly specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

An actuator 100 for adjusting a display terminal 200 according to an embodiment of the present disclosure is described below with reference to FIG. 1 to FIG. 19. The actuator 100 is configured to rotate the display terminal 200, for example, to switch the display terminal 200 between a landscape mode and a portrait mode, or rotate the display terminal 200 to other angles. The display terminal 200 may be a touch screen.

Figure 2:
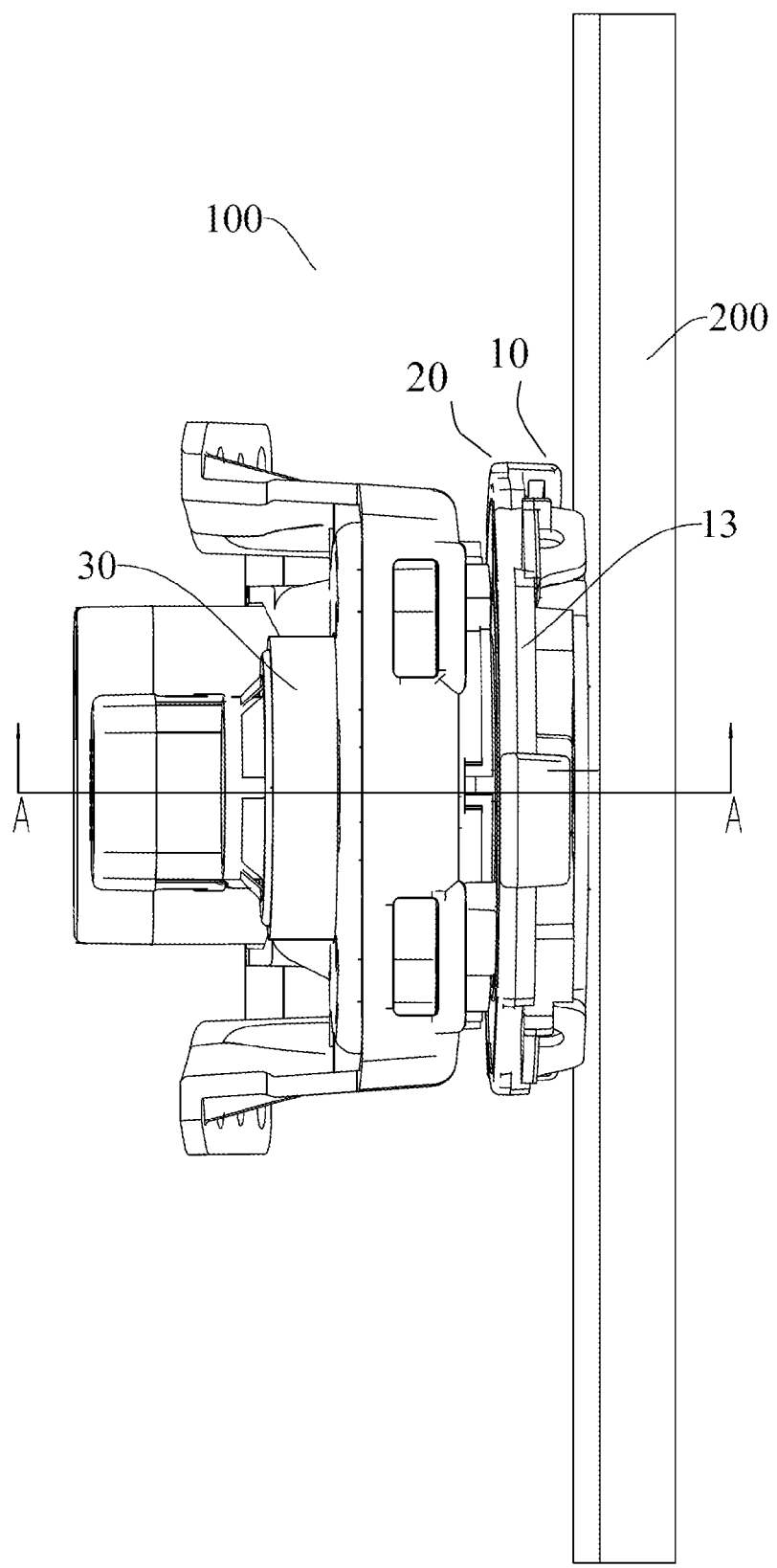
FIG. 2 is a side view of an actuator according to an embodiment of the present disclosure after assembling.
Figure 3:
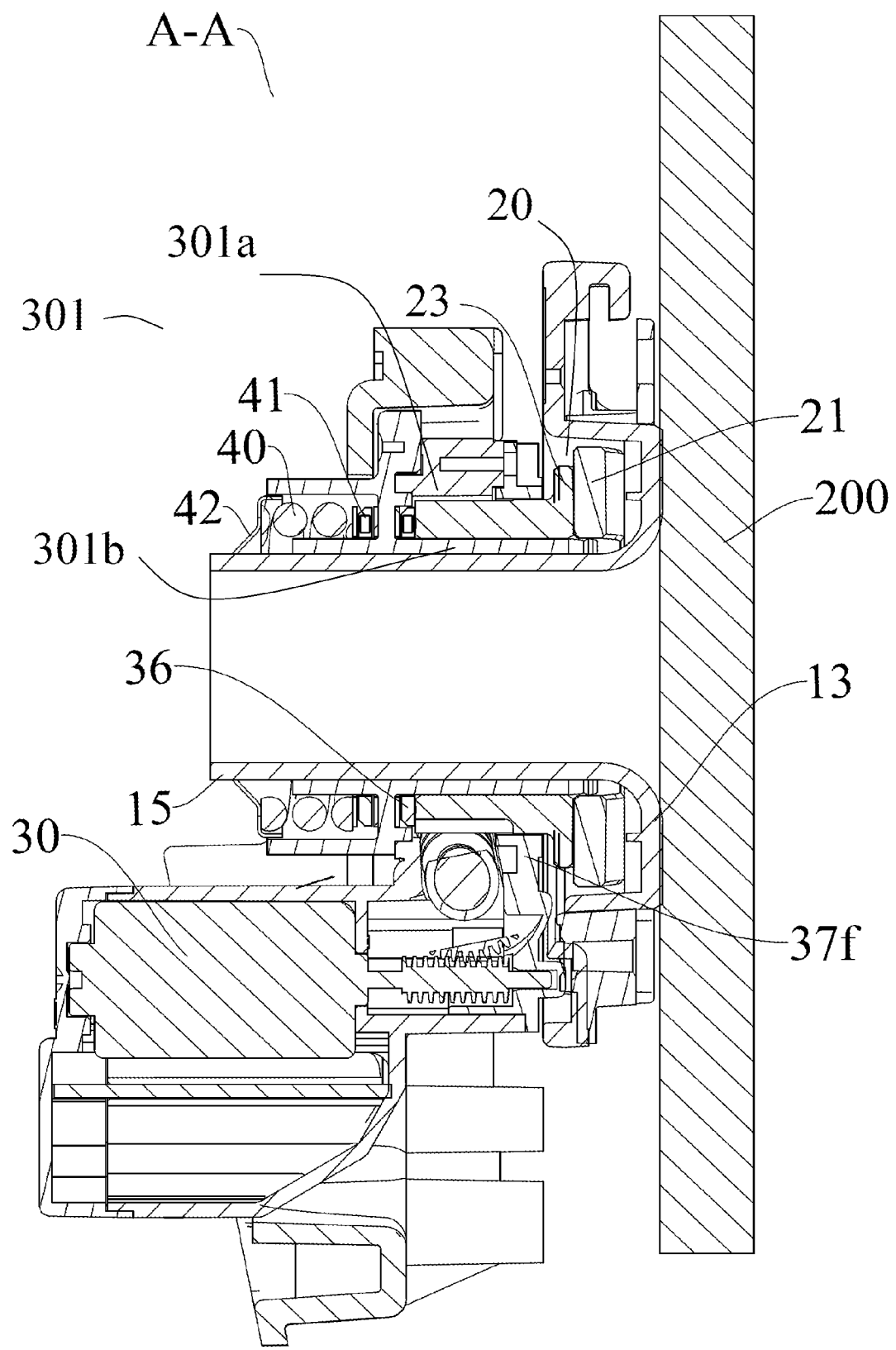
FIG. 3 is a cross-sectional view at A-A in FIG. 2.

As shown in FIG. 1 to FIG. 3, the actuator 100 for adjusting the display terminal 200 according to an embodiment of the present disclosure includes: a mounting unit 10, a clutch unit 20, and a drive unit 30.

The mounting unit 10 is configured to mount the display terminal 200. The display terminal 200 may be fixedly mounted on the mounting unit 10, or may be detachably connected to the mounting unit 10.

Figure 9:
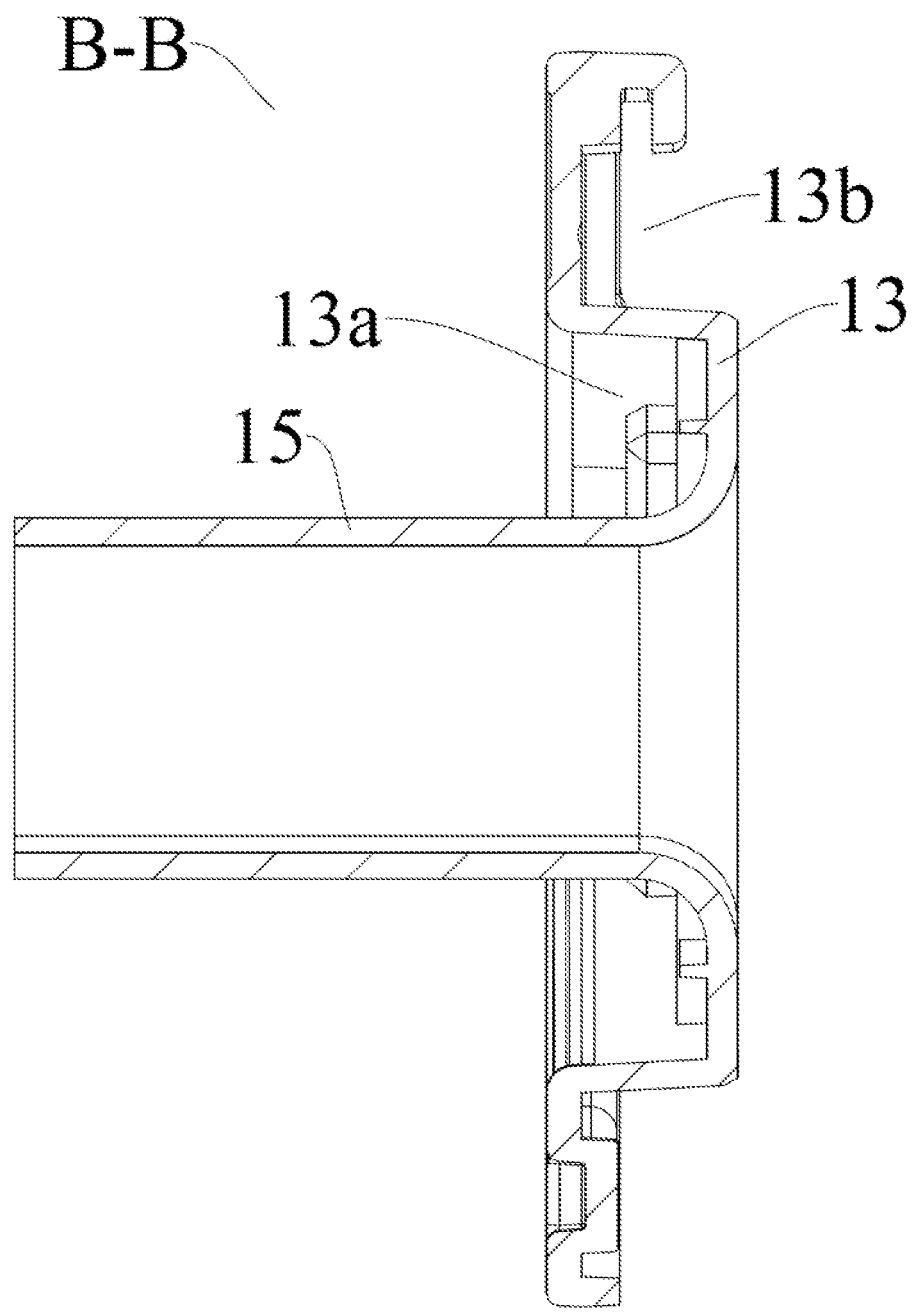
FIG. 9 is a cross-sectional view at B-B in FIG. 8.

Referring to FIG. 1, FIG. 3, and FIG. 9, the mounting unit 10 may include: a mounting bracket 11, a rotating turntable 13, and a mounting shaft 15.

The mounting bracket 11 is configured to mount the display terminal 200, and the mounting bracket 11 is fixedly connected to the display terminal 200 (provided with a corresponding interface structure) by using a bolt, or the mounting bracket 11 may be integrated on a back of the display terminal 200. The mounting bracket 11 is fixedly connected to the rotating turntable 13 by a using buckle and two screws. In some embodiments, the mounting bracket 11 is detachably mounted on the rotating turntable 13.

As shown in FIG. 1, FIG. 3, and FIG. 9, the rotating turntable 13 has a first groove 13a and a second groove 13b respectively located at two ends of the rotating turntable 13.

The rotating turntable 13 has a first groove 13a at one end facing a first engaging portion 21 of the clutch unit 20. At least a part of the first engaging portion 21 is located in the first groove 13a to shorten an axial distance of the entire actuator 100. In some embodiments, as shown in FIG. 3, the entire first engaging portion 21 is located in the first groove 13a, and at least a part of a second engaging portion 23 of the clutch unit 20 is located in the first groove 13a. In a specific implementation, the entire second engaging portion 23 is located in the first groove 13a to further shorten the axial distance of the entire actuator 100. An overall axial length of the actuator 100 is shorter, so that a layout is more compact and proper, and a connection is tighter. The display terminal 200 is connected to the mounting unit 10 through a connection to the bracket 11, and the second groove 13b is adapted to receive and to be connected to the bracket 11. In some embodiments, the connecting bracket 11 may be connected to the rotating turntable 13 through at least one of buckling and a bolt connection, and the connecting bracket 11 may be formed in a ring shape and include a plurality of claw-shaped connecting members distributed in a ring shape. The plurality of claw-shaped connecting members may protrude into and be inserted into the second groove 13b. In this way, not only the connecting bracket 11 intrudes into the rotating turntable 13, but also the plurality of claw-shaped connecting members define a cavity 11a. The cavity 11a is located behind the display terminal. At least a part of the rotating turntable 13 protrudes into the cavity 11a. In this way, a space of the mounting unit 10 behind the display terminal 200 is properly utilized, and the overall axial length of the actuator 100 is significantly reduced, so that the layout is more compact and proper, and the connection is tighter.

As shown in FIG. 2 and FIG. 3, the rotating turntable 13 is dynamically coupled to the first engaging portion 21 by using a spline. For example, a first spline is provided on an end surface of the rotating turntable 13 facing away from the display terminal 200, and a second spline is provided on an end surface of the first engaging portion 21 facing away from the second engaging portion 23, so that the rotating turntable 13 and the first engaging portion 21 are connected by using the first spline and the second spline.

Certainly, the rotating turntable 13 may also be integrally formed with the first engaging portion 21. In this way, a number of components to be assembled and assembling processes can be reduced.

As shown in FIG. 9, the rotating turntable 13 may have a disc shape, and a circular through hole is provided at a middle part of the rotating turntable 13, that is, the rotating turntable 13 is annular. The mounting shaft 15 extends axially from an inner periphery of the rotating turntable 13. The mounting shaft 15 may be a hollow shaft, and an inner peripheral wall of the mounting shaft 15 is coplanar with an inner peripheral wall of the circular through hole. The rotating turntable 13 is connected to the mounting shaft 15, and the mounting shaft 15 and the rotating turntable 13 may be formed integrally. Certainly, the mounting shaft 15 and the rotating turntable 13 may be separated and connected by using a buckling structure.

The mounting shaft 15 penetrates the clutch unit 20 and the drive unit 30. The mounting shaft 15 is configured to connect various components into a whole. The mounting shaft 15 does not transmit power. When rotation of the rotating turntable 13 rotates, the mounting shaft 15 may rotate or not. The mounting shaft 15 may be a hollow shaft to reduce a weight and facilitate wiring. The clutch unit 20 is located outside a housing of the drive unit 30.

Figure 6:
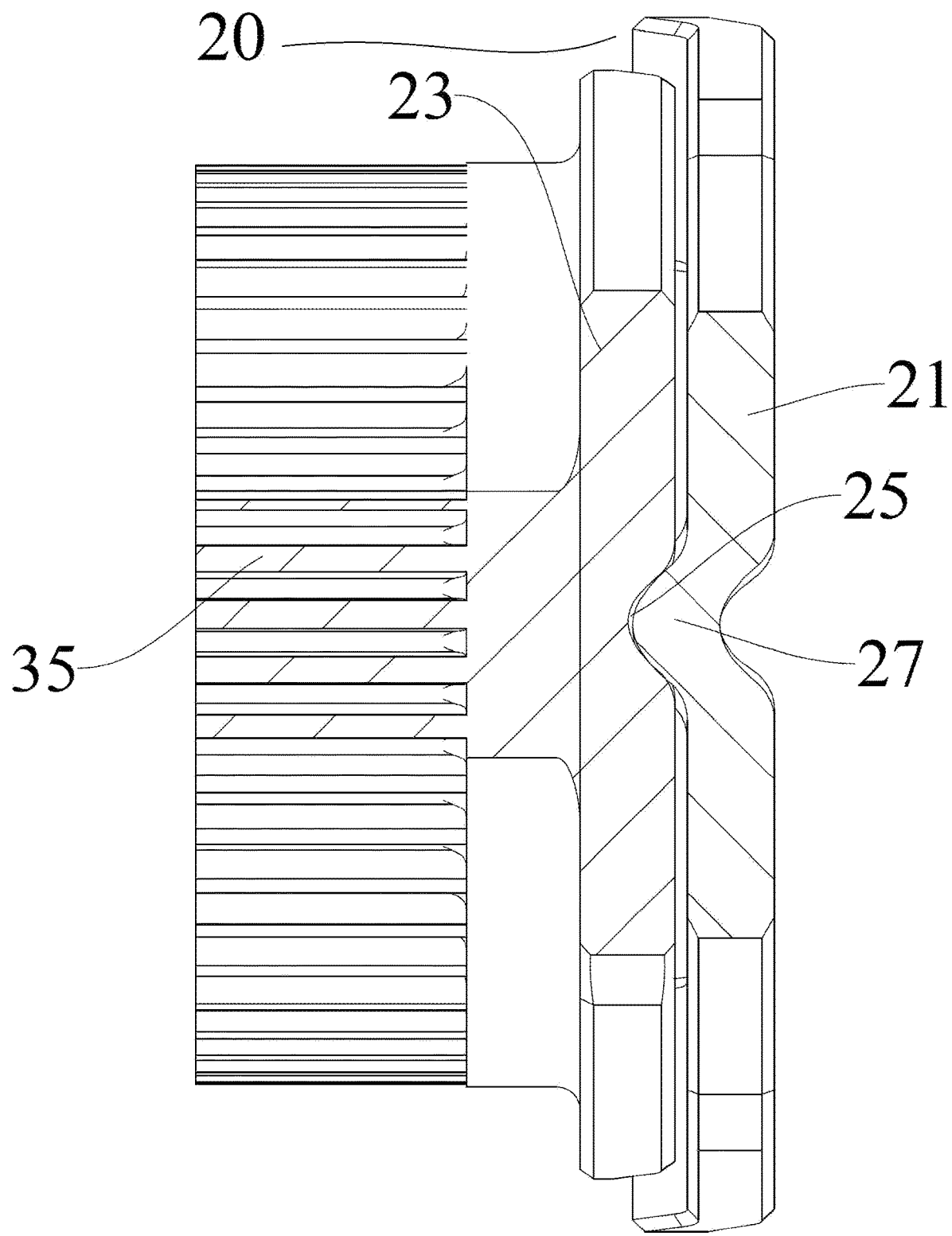
FIG. 6 is a schematic structural diagram of a clutch unit according to an embodiment of the present disclosure.
Figure 7:
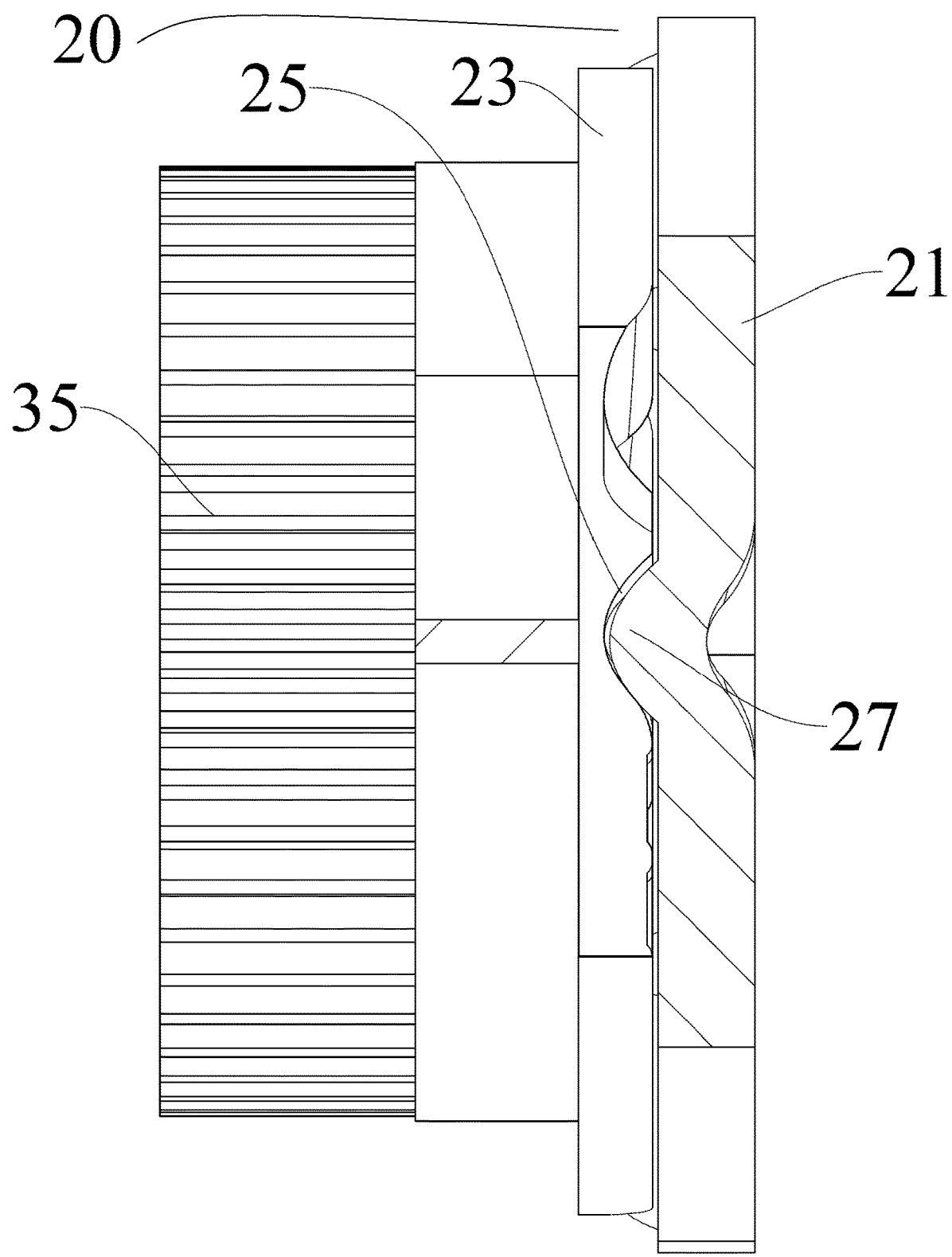
FIG. 7 is a schematic structural diagram of a clutch unit according to another embodiment of the present disclosure.

As shown in FIG. 6 and FIG. 7, the clutch unit 20 includes a first engaging portion 21 and a second engaging portion 23. The first engaging portion 21 of the clutch unit 20 is connected to the mounting unit 10, and power may be transmitted between the first engaging portion 21 and the mounting unit 10. The second engaging portion 23 and the first engaging portion 21 of the clutch unit 20 are normally interlocked with each other. "Normally interlocked with each other" means that the second engaging portion 23 and the first engaging portion 21 are interlocked with each other in a normal state. When an external force applied between the second engaging portion 23 and the first engaging portion 21 is less than a pre-tension force existing when the second engaging portion 23 and the first engaging portion 21 are interlocked with each other, the second engaging portion 23 and the first engaging portion 21 remain a locked state, and the second engaging portion 23 and the first engaging portion 21 of the clutch unit 20 are locked immediately after being engaged. The first engaging portion 21 and the second engaging portion 23 are engaged with each other and have a plurality of engaging positions. The mounting unit 10 is configured to be manually rotatable to drive the first engaging portion 21 to rotatably switch between the plurality of engaging positions relative to the second engaging portion 23. During engagement between the second engaging portion 23 and the first engaging portion 21, the clutch unit 20 may transmit a torque. The second engagement portion 23 and the first engagement portion 21 have a plurality of engaging positions. For example, a plurality of engaging positions are formed on end surfaces of the first engaging portion 21 and the second engaging portion 23 opposite to each other. An output end of the drive unit 30 is dynamically coupled to the second engaging portion 23. The clutch unit 20 is located outside the housing of the drive unit 30.

In some embodiments, alternatively, the clutch unit 20 includes a first engaging portion 21 and a second engaging portion 23 with opposite end surfaces. One of the two end surfaces of the first engaging portion 21 and the second engaging portion 23 facing each other has a plurality of locking slots 25, and the other has at least one locking protrusion 27. The actuator 100 may further include a component configured to provide an axial pre-tension force. Each of the locking protrusions is adapted to be engaged with at least two locking slots 25 under action of an axial pre-tension force, so that the second engaging portion 23 and the first engaging portion 21 are adapted to be engaged at least two engaging positions distributed in a circumferential direction. When the engaging position is changed, the second engaging portion 23 and the drive unit 30 remain stationary relative to each other in an axial direction, and the first engaging portion 21 moves away from the second engaging portion 23 in the axial direction. The first engaging portion 21 is connected to the mounting unit 10, and the output end of the drive unit 30 is connected to the second engaging portion 23.

When the engaging position is changed, the second engaging portion 23 and the drive unit 30 remain stationary relative to each other in the axial direction, and the first engaging portion 21 moves away from the second engaging portion 23 in the axial direction. In this way, the internal components of the drive unit 30 can be prevented from shaking, so that drive and transmission of the drive unit 30 are more stable.

The drive unit 30 may be an electric drive type, a hydraulic drive type, or a pneumatic type, etc.

Figure 4:
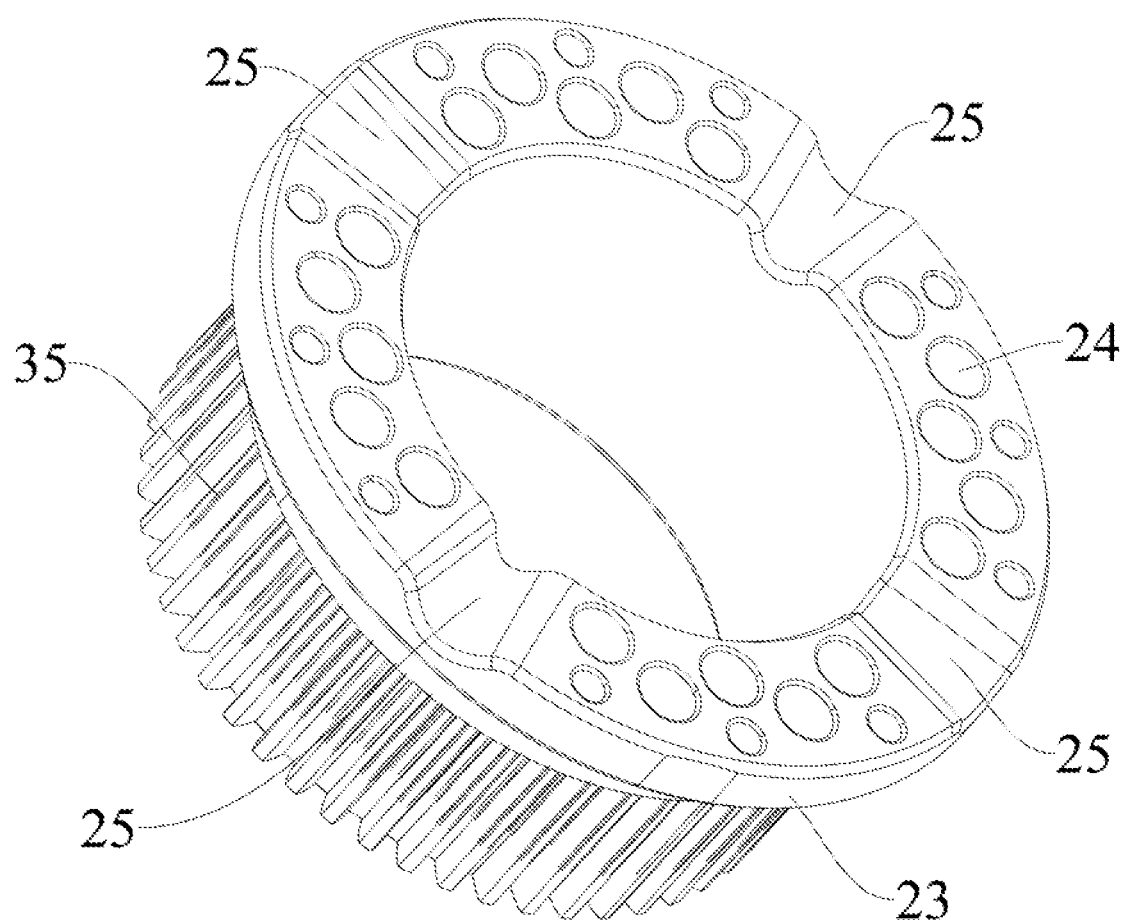
FIG. 4 is a schematic structural diagram of integration of a second engaging portion and a second-stage driven spur gear according to an embodiment of the present disclosure.

As shown in FIG. 4, the clutch unit 20 may be located outside the housing of the drive unit 30, so that during assembling of the clutch unit 20, the clutch unit 20 is unlikely to interfere with the various components of the drive unit 30, and it is not necessary to design a separate mounting space for the clutch unit 20 in the housing of the drive unit 30, simplifying the design. In some embodiments, since the first engaging portion 21 and the second engaging portion 23 of the clutch unit 20 rotate relative to each other in a manual mode, if a part of the clutch unit 20 is provided in the housing of the drive unit 30, the actuator 100 may be stuck during operation.

At least a part of the clutch unit 20 is located in the mounting unit 10. As described in the above embodiment, at least a part of the first engaging portion 21 or the second engaging portion 23 is located in the rotating turntable 13, so that the overall axial length of the actuator 100 can be significantly reduced. Therefore, the arrangement is more compact and proper, and the connection is tighter.

The first engaging portion 21 and the second engaging portion 23 are normally interlocked with each other, and the mounting unit 10 is configured to be manually rotatable to drive the first engaging portion 21 to rotatably switch between the plurality of engaging positions relative to the second engaging portion 23.

During working of the drive unit 30, the second engaging portion 23 is engaged with the first engaging portion 21. It may be understood that, in the normal state, the first engaging portion 21 and the second engaging portion 23 are engaged with each other under the action of the axial pre-tension force, and a torque may be transmitted. A drive force is transmitted along the following path: drive unit 30-second engaging portion 23-first engaging portion 21-rotating turntable 13-mounting bracket 11-display terminal 200, so as to rotate the display terminal 200, thereby achieving rotation of the display terminal 200 or switching between a landscape mode and a portrait mode.

The first engaging portion 21 and the second engaging portion 23 form a static friction in the circumferential direction under the action of the axial pre-tension force. The static friction in the circumferential direction forms an opening force for the relative rotation of the first engaging portion 21 and the second engaging portion 23. When a torque received by the first engaging portion 21 is greater than the opening force, the first engaging portion 21 and the second engaging portion 23 rotate relative to each other to change the engaging position. When the torque received by the first engaging portion 21 is less than the opening force, the first engaging portion 21 and the second engaging portion 23 remain engaged with each other to transmit a torque.

During working of the actuator 100, the drive unit 30 does not work, and when the torque received by the first engaging portion 21 is greater than the opening force, the second engaging portion 23 and the first engaging portion 21 rotate relative to each other to change the engaging position.

For example, a torque is manually applied to the display terminal 200 to rotate the display terminal. The torque is transmitted to the first engaging portion 21 through the mounting unit 10. Since the drive unit 30 is locked when idle, and the drive unit 30 is fixedly connected to the second engaging portion 23, when the torque is not greater than the opening force, the first engaging portion 21 and the second engaging portion 23 remain engaged, and the display terminal 200 does not rotate. When the torque is greater than the opening force, the first engaging portion 21 rotates relative to the second engaging portion 23 from a previous engaging position to another engaging position. When the first engaging portion 21 moves relative to the second engaging portion 23 from the first engaging position to the second engaging position, manual rotation of the display terminal 200 can be achieved.

According to the actuator 100 for adjusting the display terminal 200 in this embodiment of the present disclosure, not only manual screen switching of the display terminal 200 can be achieved, but also automatic screen switching can be achieved. In other words, a manual rotation manner and an automatic rotation manner of the display terminal 200 can be coupled together through the clutch unit 20, and the two screen switching manners do not interfere with each other.

A specific structure of the clutch unit 20 according to this embodiment of the present disclosure is described below.

The clutch unit 20 in this embodiment of the present disclosure may be used as a part of the actuator 100 for adjusting the display terminal 200, and is configured to output, to the display terminal 200, power outputted by the drive unit 30 of the actuator 100, thereby coupling a manual function and an automatic driving function together.

Figure 5:
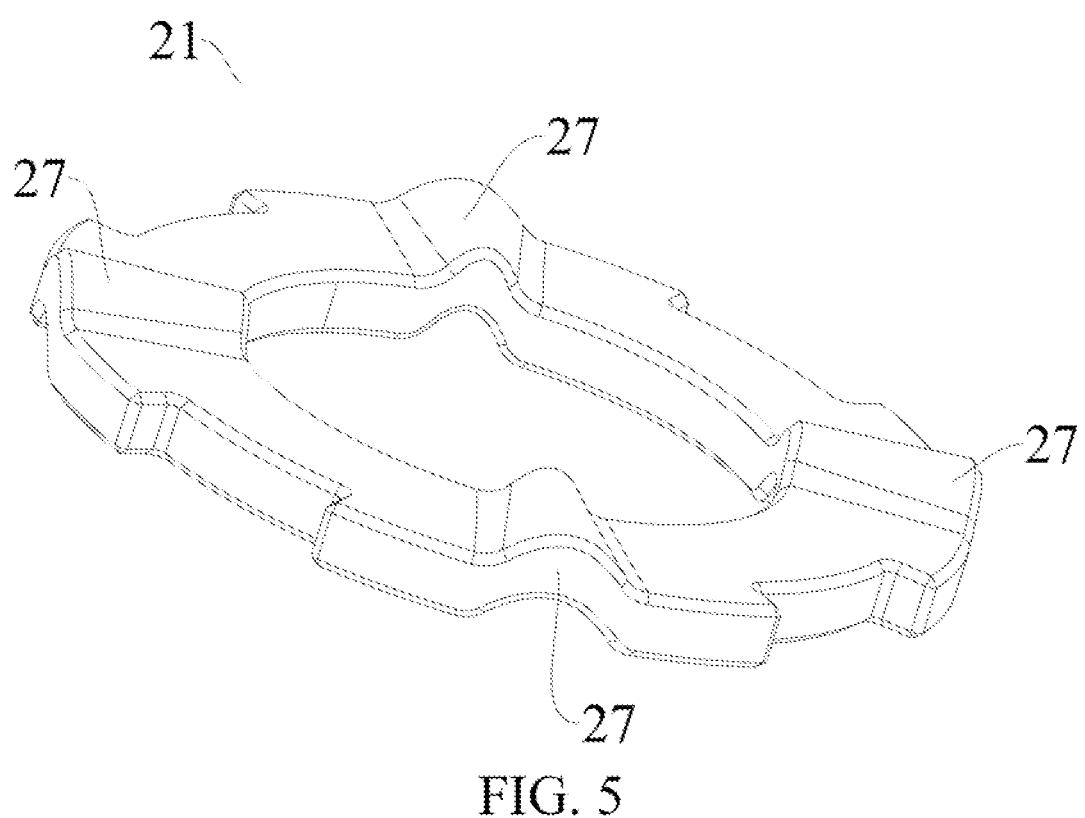
FIG. 5 is a schematic structural diagram of a first engaging portion according to an embodiment of the present disclosure.

In an embodiment of the clutch unit 20, as shown in FIG. 4 to FIG. 6, the clutch unit 20 includes: a first engaging portion 21 and a second engaging portion 23. End surfaces of the first engaging portion 21 and the second engaging portion 23 are opposed to each other. One of the two end surfaces of the first engaging portion 21 and the second engaging portion 23 facing each other has a plurality of locking slots 25, and the other of the two end surfaces of the first engaging portion 21 and the second engaging portion 23 facing each other has at least one locking protrusion 27.

For example, the locking slot 25 is provided on the end surface of the first engaging portion 21, and the locking protrusion 27 is provided on the end surface of the second engaging portion 23. Alternatively, the locking slot 25 is provided on the end surface of the second engaging portion 23, and the locking protrusion 27 is provided on the end surface of the first engaging portion 21.

Each of the locking protrusions 27 is adapted to be engaged with at least two of the locking slots 25 so that the second engaging portion 23 and the first engaging portion 21 are adapted to be engaged at least two engaging positions in the circumferential direction.

As shown in FIG. 4 to FIG. 6, the first engaging portion 21 and the second engaging portion 23 both may be annular. One end surface of the first engaging portion 21 and one end surface of the second engaging portion 23 are opposite to each other. An oil groove 24 is provided on the end surface of one of the first engaging portion 21 and the second engaging portion 23. The oil groove 24 is configured to store lubricating oil to reduce a friction. For example, the oil groove 24 is provided on the end surface of one of the first engaging portion 21 and the second engaging portion 23 on which the locking slot 25 is provided. There may be a plurality of oil grooves 24. A plurality of oil grooves 24 are provided between two adjacent locking slots 25.

One of the two end surfaces of the first engaging portion 21 and the second engaging portion 23 facing each other has a plurality of locking slots 25, and the other has at least one locking protrusion 27. At least a part of the locking protrusion 27 protrudes into the locking slot 25. When a side surface of the locking protrusion 27 is pressed against a side wall of the locking slot 25, the locking protrusion 27 is engaged with the locking slot 25, so that the first engaging portion 21 and the second engaging portion 23 are engaged. For example, the locking slot 25 is provided on the end surface of the first engaging portion 21, and the locking protrusion 27 is provided on the end surface of the second engaging portion 23. Alternatively, the locking slot 25 is provided on the end surface of the second engaging portion 23, and the locking protrusion 27 is provided on the end surface of the first engaging portion 21. For ease of description, in further descriptions, the locking protrusion 27 is provided on the end surface of the first engaging portion 21, and the locking slot 25 is provided on the end surface of the second engaging portion 23, for example.

The first engaging portion 21 may be splined or formed integrally with the rotating turntable 13 described in the above embodiments. In other embodiments, the end surface of the first engaging portion 21 is configured such that the rotating turntable 13 faces the end surface of the second engaging portion 23. The locking protrusion 27 is formed on the end surface, that is, a turntable surface of the first engaging portion 21 is omitted. In this way, the entire actuator 100 has a small weight. The locking protrusion 27 may be integrally formed on the end surface of the rotating turntable 13 facing the second engaging portion 23, or the locking protrusion 27 may be detachably connected to the rotating turntable 13, so that the rotating turntable 13 has a simpler structure and is more easily formed.

The plurality of locking slots 25 are evenly spaced and arranged along a circumferential direction of the second engaging portion 23, and the plurality of locking protrusions 27 are evenly spaced and arranged along a circumferential direction of the first engaging portion 21. There are the same number of locking slots 25 and the locking protrusions 27. For example, there are respectively at least three, for example, four locking slots 25 and locking protrusions 27. In an embodiment in which there are respectively four locking slots 25 and locking protrusions 27, an included angle between center lines of two adjacent locking slots 25 is 90° without consideration of a processing error. In an initial state, the plurality of locking protrusions 27 are engaged with the plurality of locking slots 25 in one-to-one correspondence. When the first engaging portion 21 rotates relative to the second engaging portion 23 until a specific locking protrusion 27 is engaged with another adjacent locking slot 25, the display terminal can be rotated.

Each of the locking protrusions 27 is adapted to be engaged with at least two of the locking slots 25 so that the second engaging portion 23 and the first engaging portion 21 are adapted to be engaged at least two engaging positions. For example, for a specific locking protrusion 27, the locking protrusion 27 may be engaged with two locking slots 25, and an angle between center lines of the two locking slots 25 represents an angle by which the first engaging portion 21 and the second engaging portion 23 rotate relative to each other.

Figure 18:
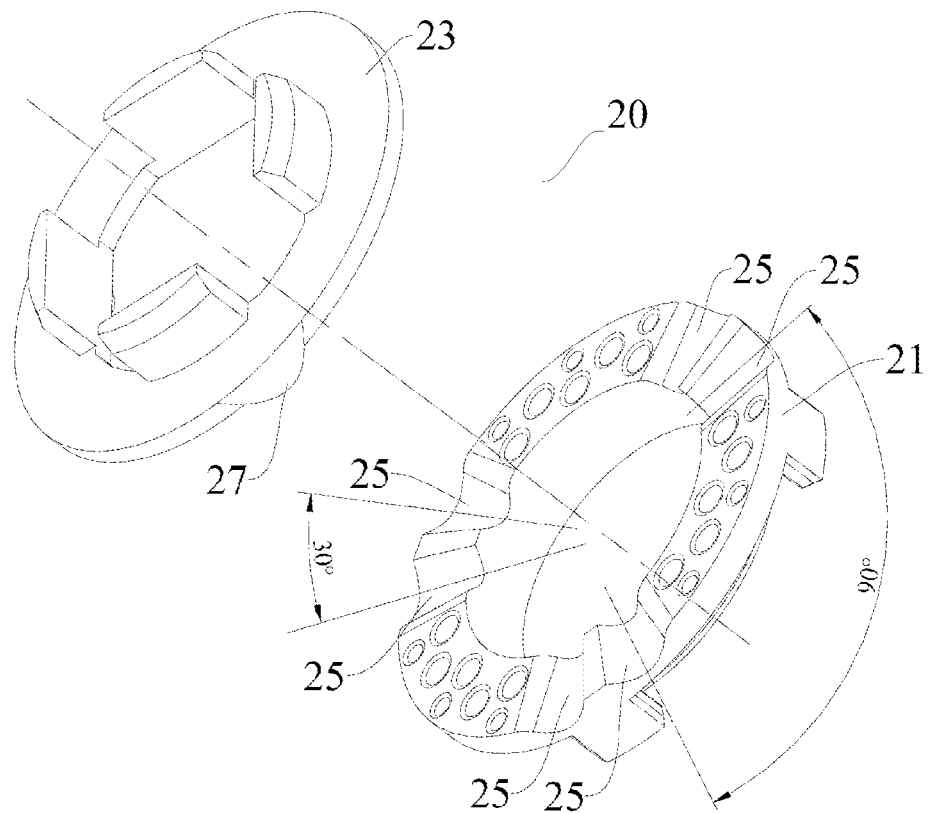
FIG. 18 is an exploded view of a clutch unit according to an embodiment of the present disclosure.

As shown in FIG. 18, there are a plurality of groups of locking slots 25. Each group includes a plurality of locking slots 25. Different groups of locking slots 25 are alternately disposed in the circumferential direction. When the first engaging portion 21 and the second engaging portion 23 are engaged at one of the engaging positions, the plurality of locking protrusions 27 are in one-to-one correspondences with one group of the plurality of locking slots 25. When the first engaging portion 21 and the second engaging portion 23 rotate to another engaging position, the plurality of locking protrusions 27 are in one-to-one correspondences with another group of the plurality of locking slots 25. An included angle between center lines of two locking slots 25 corresponding to each other in the two groups of locking slots 25 is 90°.

A number of groups of the locking slots 25 may correspond to a number of positions of the display terminal 200. For example, when the display terminal 200 includes two positions: a landscape mode and a portrait mode, there are two groups of locking slots 25. For example, there are two groups of locking slots 25. Each group includes three locking slots 25 evenly spaced in the circumferential direction. The two groups of locking slots 25 are alternately disposed in the circumferential direction. For example, one locking slot 25 in a second group is provided on both sides of each locking slot 25 in the first group, so that during each rotation, each locking protrusion 27 only needs to be inserted from one locking slot 25 into another locking slot 25, and does not fall into a non-target locking slot 25 during rotation. An included angle between a center line of the locking slot 25 in the first group and a center line of one of the two locking slots 25 in the second group is 90°, and an included angle between the center line of the locking slot 25 in the first group and a center line of the other of the two locking slots 25 in the second group is 30°. There are three locking protrusions 27 evenly spaced in the circumferential direction. When the three locking protrusions 27 matches different groups of locking slots 25, the display terminal 200 can be rotated.

As shown in FIG. 4 to FIG. 6, the locking slot 25 and the locking protrusion 27 both have an arc-shaped cross section. A width of a root of the locking protrusion 27 is greater than a width of a top end of the locking protrusion 27, a width of an open end of the locking slot 25 is greater than a width of a bottom of the locking slot 25, and a width of the locking protrusion 27 gradually decreases from the root to the top end.

When an arc-shaped side surface of the locking protrusion 27 is pressed against an arc-shaped side wall of the locking slot 25, a torque may be transmitted between the first engaging portion 21 and the second engaging portion 23. When the torque between the first engaging portion 21 and the second engaging portion 23 is greater than the above opening force, the arc-shaped side surface of the locking protrusion 27 and the arc-shaped side wall of the locking slot 25 slide relative to each other. When the locking protrusion 27 is pressed against the end surface of the first engaging portion 21 or the second engaging portion 23, the first engaging portion 21 and the second engaging portion 23 are disengaged, and the locking protrusion 27 slides to another locking slot 25 along the end surface of the first engaging portion 21 or the second engaging portion 23, so that the display terminal 200 is rotated.

Due to the arc-shaped locking slot 25 and the arc-shaped locking protrusion 27, the first engaging portion 21 and the second engaging portion 23 can be disengaged through relative sliding of the arc-shaped surfaces when receiving a large torque, and therefore are unlikely to be stuck. After the locking slot 25 and the locking protrusion 27 are disengaged, the arc-shaped locking protrusion 27 slides along the end surface of the second engaging portion 23. Since a friction between the first engaging portion 21 and the second engaging portion 23 is reduced, the first engaging portion and the second engaging portion can quickly slide to a next engaging position, and are unlikely to be stuck.

As shown in FIG. 4 to FIG. 6, viewed along an axial direction of the clutch unit 20, the locking slot 25 and the locking protrusion 27 both are an annular sector concentric with the first engaging portion 21 or the second engaging portion 23. The locking slot 25 and the locking protrusion 27 both have a sector-annular cross section concentric with the first engaging portion 21 or the second engaging portion 23. In other words, a width of the locking slot 25 and the width of the locking protrusion 27 gradually increase from inside to outside along the radial direction. It may be understood that when a torque is being transmitted between the first engaging portion 21 and the second engaging portion 23, an outer end of the locking slot 25 and an outer end of the locking protrusion 27 receive a large moment. According to the above structure, force-receiving areas of the outer end of the locking slot 25 and the outer end of the locking protrusion 27 can be increased, pressure on the outer end of the locking slot 25 and the outer end of the locking protrusion 27 can be reduced, and strength of the outer end of the locking slot 25 and the outer end of the locking protrusion 27 can be enhanced, thereby avoiding breakage. The outer end refers to an end of the locking slot 25 and the locking protrusion 27 facing away from an axis of the first engaging portion 21 or the second engaging portion 23.

As shown in FIG. 4 to FIG. 6, a width of at least a part of the locking protrusion 27 is greater than the width of the open end of the locking slot 25, and at least one side of the locking protrusion 27 is pressed against a corresponding side of the locking slot 25 so that the locking protrusion 27 is engaged with the locking slot 25. In this way, it can be ensured that each locking protrusion 27 is engaged with a corresponding locking slot 25, and when there is a specific error between an actual rotation angle of the display terminal 200 and a design angle, each locking protrusion 27 remains engaged with the corresponding locking slot 25, preventing a part of the locking protrusion 27 from being falsely engaged with the corresponding locking slot 25. The false engagement means that the locking protrusion 27 protrudes into the corresponding locking slot 25, but is not pressed against a wall surface of the locking slot 25.

In some embodiments, the width of the locking slot 25 gradually decreases from the open end to the bottom, the width of the locking protrusion 27 gradually decreases from the root to the top, and the width of the open end of the locking slot 25 is less than the width of the root of the locking protrusion 27. In other words, a central angle of an annular sector at the open end of the locking slot 25 is less than a central angle of an annular sector at the root of the locking protrusion 27 when the first engaging portion 21 and the second engaging portion 23 are engaged.

It may be understood that under in an ideal case (without consideration of processing errors of the locking protrusion 27 and the locking slot 25), positions with equal heights on two sides of each locking boss are respectively pressed against two sides of the open end of the locking slot 25. Due to processing errors, for example, an included angle of two adjacent locking bosses is not equal to 90°, and widths of the locking bosses are different, etc., some locking bosses may be pressed against a single side of corresponding locking slots 25. At least one side of the locking protrusion 27 is pressed against a corresponding side of the locking slot 25 so that the locking protrusion 27 is engaged with the locking slot 25.

In other words, according to the locking protrusion 27 and the locking slot 25 with the above structure, it can be ensured that each locking protrusion 27 is engaged with a corresponding locking slot 25, and when there is a specific error between an actual rotation angle of the display terminal 200 and a design angle, each locking protrusion 27 remains engaged with the corresponding locking slot 25, preventing a part of the locking protrusion 27 from being falsely engaged with the corresponding locking slot 25. In addition, a part of the locking protrusion 27 is engaged with the locking slot 25, helping the locking protrusion 27 slide out of the locking slot 25 during manual operation.

During specific implementation, a depth of the locking slot 25 is less than a height of the locking protrusion 27, so that the second engaging portion 23 has larger strength.

In another embodiment of the clutch unit 20, as shown in FIG. 4, FIG. 5, and FIG. 7, the first engaging portion 21 and the second engaging portion 23 both may be annular. One end surface of the first engaging portion 21 and one end surface of the second engaging portion 23 are opposite to each other. An oil groove 24 is provided on the end surface of one of the first engaging portion 21 and the second engaging portion 23. The oil groove 24 is configured to store lubricating oil to reduce a friction.

One of the two end surfaces of the first engaging portion 21 and the second engaging portion 23 facing each other has a plurality of locking slots 25, and the other has at least one locking protrusion 27. At least a part of the locking protrusion 27 protrudes into the locking slot 25. When a side surface of the locking protrusion 27 is pressed against a side wall of the locking slot 25, the locking protrusion 27 is engaged with the locking slot 25, so that the first engaging portion 21 and the second engaging portion 23 are engaged.

Each of the locking protrusions 27 is adapted to be engaged with at least two of the locking slots 25 so that the second engaging portion 23 and the first engaging portion 21 are adapted to be engaged at least two engaging positions. For example, for a specific locking protrusion 27, the locking protrusion 27 may be engaged with two locking slots 25, and an angle between center lines of the two locking slots 25 represents an angle by which the first engaging portion 21 and the second engaging portion 23 rotate relative to each other.

For example, the locking slot 25 is provided on the end surface of the first engaging portion 21, and the locking protrusion 27 is provided on the end surface of the second engaging portion 23. Alternatively, the locking slot 25 is provided on the end surface of the second engaging portion 23, and the locking protrusion 27 is provided on the end surface of the first engaging portion 21. For ease of description, in further descriptions, the locking protrusion 27 is provided on the end surface of the first engaging portion 21, and the locking slot 25 is provided on the end surface of the second engaging portion 23, for example.

As shown in FIG. 18, there are a plurality of groups of locking slots 25. Each group includes a plurality of locking slots 25. Different groups of locking slots 25 are alternately disposed in the circumferential direction. When the first engaging portion 21 and the second engaging portion 23 are engaged at one of the engaging positions, the plurality of locking protrusions 27 are in one-to-one correspondences with one group of the plurality of locking slots 25. When the first engaging portion 21 and the second engaging portion 23 rotate to another engaging position, the plurality of locking protrusions 27 are in one-to-one correspondences with another group of the plurality of locking slots 25. An included angle between center lines of two locking slots 25 corresponding to each other in the two groups of locking slots 25 is 90°.

A number of groups of the locking slots 25 may correspond to a number of positions of the display terminal 200. For example, when the display terminal 200 includes two positions: a landscape mode and a portrait mode, there are two groups of locking slots 25. For example, there are two groups of locking slots 25. Each group includes three locking slots 25 evenly spaced in the circumferential direction. The two groups of locking slots 25 are alternately disposed in the circumferential direction. For example, one locking slot 25 in a second group is provided on both sides of each locking slot 25 in the first group. An included angle between a center line of the locking slot 25 in the first group and one of center lines of the two locking slots 25 in the second group is 90°, and an included angle between the center line of the locking slot 25 in the first group and the other of the center lines of the two locking slots 25 in the second group is 30°. There are three locking protrusions 27 evenly spaced in the circumferential direction. When the three locking protrusions 27 are matched with different groups of locking slots 25, the display terminal 200 can be rotated.

As shown in FIG. 4, FIG. 5, and FIG. 7, the locking slot 25 and the locking protrusion 27 both have an arc-shaped cross section. A width of a root of the locking protrusion 27 is greater than a width of a top end of the locking protrusion 27, a width of an open end of the locking slot 25 is greater than a width of a bottom of the locking slot 25, and a width of the locking protrusion 27 gradually decreases from the root to the top end.

The locking slot 25 and the locking protrusion 27 are in clearance fit in the circumferential direction, that is, a width of the locking slot 25 in the circumferential direction is greater than a width of the locking protrusion 27 in the circumferential direction, a depth of the locking slot 25 is greater than a depth of the locking protrusion 27, and the width of the open end of the locking slot 25 is greater than the width of the root of the locking protrusion 27. One side of the locking protrusion 27 is pressed against one side of the locking slot 25 so that the locking protrusion 27 and the locking slot 25 are engaged. In this way, the same sides of the plurality of locking protrusions 27 in the circumferential direction are pressed against one side wall of a corresponding locking slot 25 so that of the first engaging portion 21 and the second engaging portion 23 are engaged.

When an arc-shaped side surface of the locking protrusion 27 is pressed against an arc-shaped side wall of the locking slot 25, a torque may be transmitted between the first engaging portion 21 and the second engaging portion 23. When the torque between the first engaging portion 21 and the second engaging portion 23 is greater than the above opening force, the arc-shaped side surface of the locking protrusion 27 and the arc-shaped side wall of the locking slot 25 slide relative to each other. When the locking protrusion 27 is pressed against the end surface of the first engaging portion 21 or the second engaging portion 23, the first engaging portion 21 and the second engaging portion 23 are disengaged, and the locking protrusion 27 slides to another locking slot 25 along the end surface of the first engaging portion 21 or the second engaging portion 23, so that the display terminal 200 is rotated.

Due to the arc-shaped locking slot 25 and the arc-shaped locking protrusion 27, the first engaging portion 21 and the second engaging portion 23 can be disengaged through relative sliding of the arc-shaped surfaces when receiving a large torque. In addition, after the locking slot 25 and the locking protrusion 27 are disengaged, a friction between the first engaging portion 21 and the second engaging portion 23 is reduced, so that the first engaging portion and the second engaging portion can quickly slide to a next engaging position, and are unlikely to be stuck.

As shown in FIG. 4, FIG. 5, and FIG. 7, viewed along an axial direction of the clutch unit 20, the locking slot 25 and the locking protrusion 27 both are an annular sector concentric with the first engaging portion 21 or the second engaging portion 23. The locking slot 25 and the locking protrusion 27 both have a sector-annular cross section concentric with the first engaging portion 21 or the second engaging portion 23. In other words, a width of the locking slot 25 and the width of the locking protrusion 27 gradually increase from inside to outside along the radial direction. It may be understood that when a torque is being transmitted between the first engaging portion 21 and the second engaging portion 23, the outer end receives a large moment. The above structure can increase strength of the outer end, preventing breakage.

In order to ensure that the display terminal is rotated to a target angle during manual rotation of the display terminal 200, for example, the target angle may be 90°, the display terminal 200 is switched between a landscape mode and a portrait mode, and a matching positioning mechanism is disposed between a part fixedly connected to a vehicle body and a rotating part, for example, a matching positioning mechanism is provided on the housing of the drive unit 30 and the rotating turntable 13, so that the display terminal 200 is rotated to the target angle. Two types of positioning mechanisms are described below.

Figure 12:
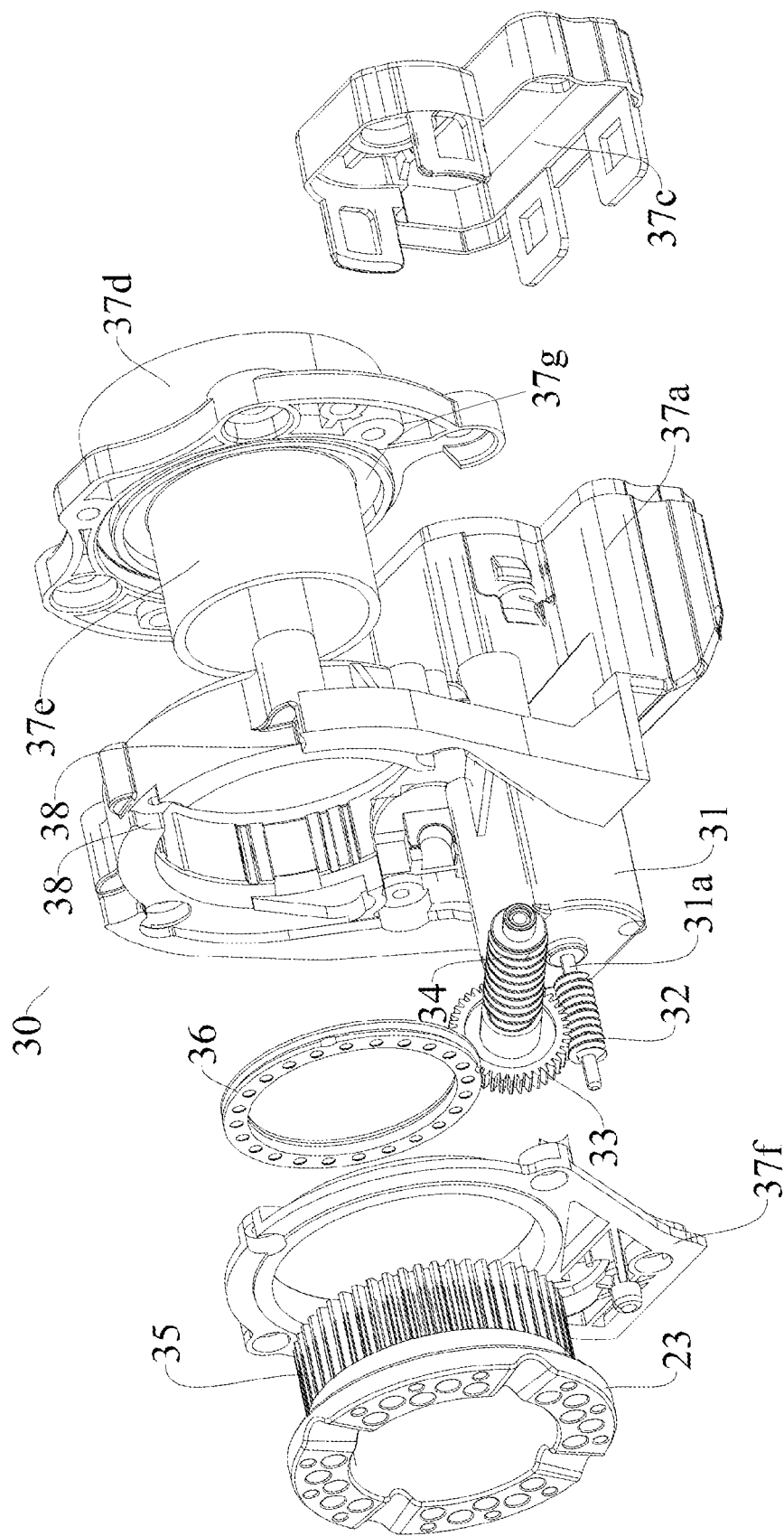
FIG. 12 is an exploded view of a drive unit according to an embodiment of the present disclosure.

In an embodiment, the positioning mechanism includes a limiting stop 38 and a positioning pin (not shown). As shown in FIG. 12, two limiting stops 38 are provided on the housing of the drive unit 30. The two limiting stops 38 are spaced apart along a circumference direction of the housing of the drive unit 30. An angle between the two limiting stops 38 is the target rotation angle, for example, 90°. A positioning pin is provided on the rotating turntable 13. The positioning pin protrudes toward the housing of the drive unit 30, and is adapted to be pressed against the limiting stop 38. At an initial position, the positioning pin is pressed against a limiting stop 38. When the display terminal 200 is rotated, the rotating turntable 13 and the positioning pin are also rotated until the positioning pin is pressed against another limiting stop 38. In this case, it indicates that the display terminal 200 is rotated in place to match the locking slots 25 and the locking protrusions 27 of the first engaging portion 21 and the second engaging portion 23, so that it can be ensured that the first engaging portion 21 and the second engaging portion 23 are always engaged.

Figure 8:
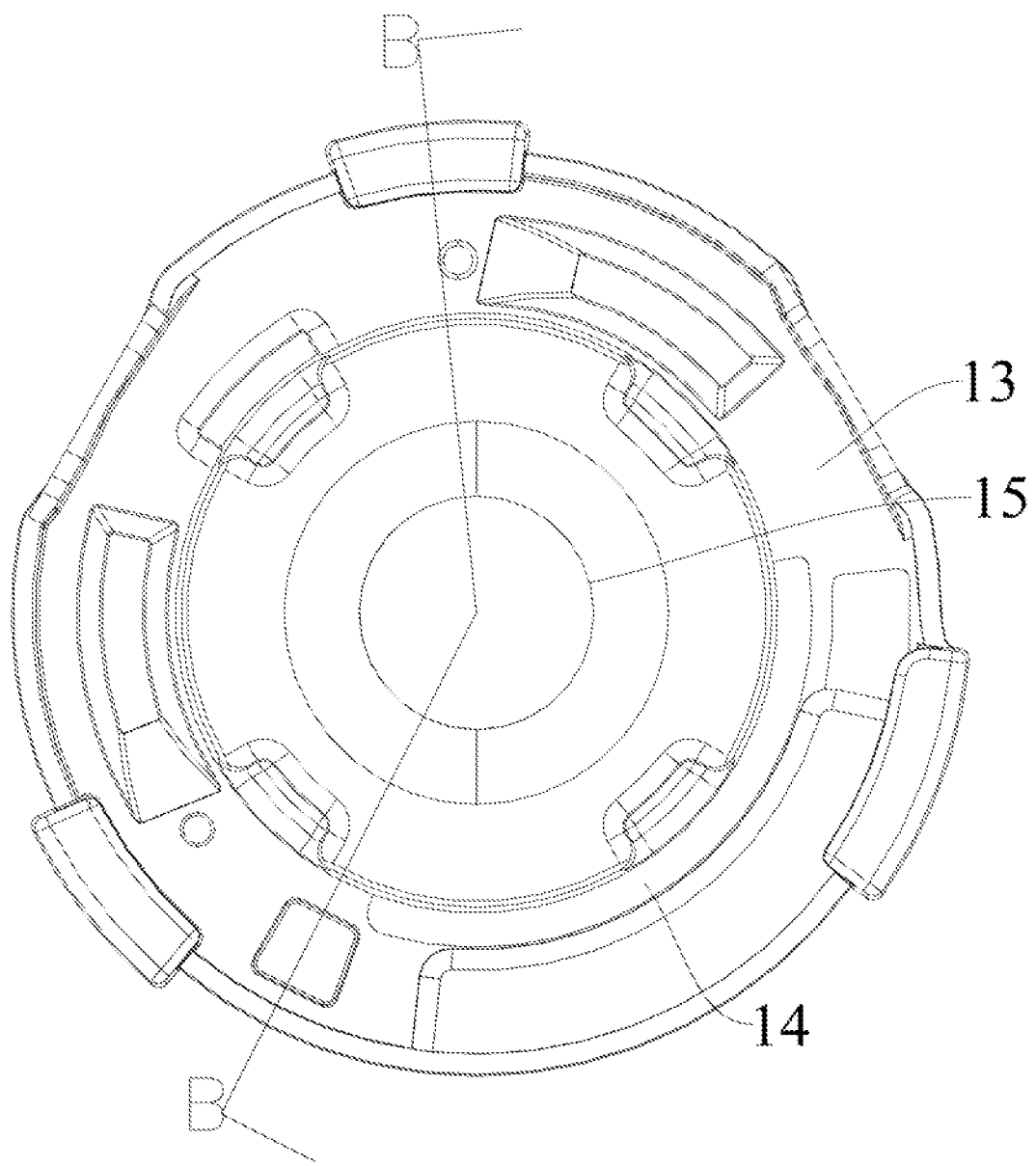
FIG. 8 is a schematic structural diagram of integration of a rotating turntable and a mounting shaft according to an embodiment of the present disclosure.

In another embodiment, the positioning mechanism includes a limiting slot 14 and a positioning pin (not shown). As shown in FIG. 8, an arc-shaped limiting slot 14 is provided on the rotating turntable 13, and a positioning pin is mounted on the drive unit 30. The positioning pin protrudes toward the limiting slot 14, and may slide in the limiting slot 14. A radian of the limiting slot 14 is equal to the target rotation angle of the display terminal 200. The positioning pin is adapted to be pressed against an end of the limiting slot 14. When the positioning pin is rotated from one end of the limiting slot 14 to the other end, it indicates that the display terminal 200 is rotated into position to match the locking slots 25 and the locking protrusions 27 of the first engaging portion 21 and the second engaging portion 23, so that it can be ensured that the first engaging portion 21 and the second engaging portion 23 are always engaged.

In some embodiments, as shown in FIG. 1 and FIG. 3, the actuator 100 further includes: an elastic member 40 elastically pressed between the mounting unit 10 and the drive unit 30 along the axial direction of the clutch unit 20, so that the drive unit 30, the clutch unit 20, and the mounting unit 10 are pressed in sequence, an elastic pre-tension force (that is, the above axial pre-tension force) of the elastic member 40 being used to engage the second engaging portion 23 with the first engaging portion 21. The elastic member 40 may be a spring.

In a manual mode, a torque is applied to the first engaging portion 21. For example, the display terminal 200 is manually rotated, so that a torque is generated between the first engaging portion 21 and the second engaging portion 23. When the torque is greater than the above opening force, the locking protrusion 27 is gradually detached from the locking slot 25. After the locking protrusion 27 is detached from the locking slot 25, the second engaging portion 23 and the drive unit 30 do not move relative to the whole vehicle in the axial direction, the elastic member 40 is compressed, the first engaging portion 21 moves away from the second engaging portion 23 in the axial direction, and the display terminal 200 also moves away from the second engaging portion 23 in the axial direction, that is, the display terminal 200 moves rearward (a rear of the vehicle).

Figure 10:
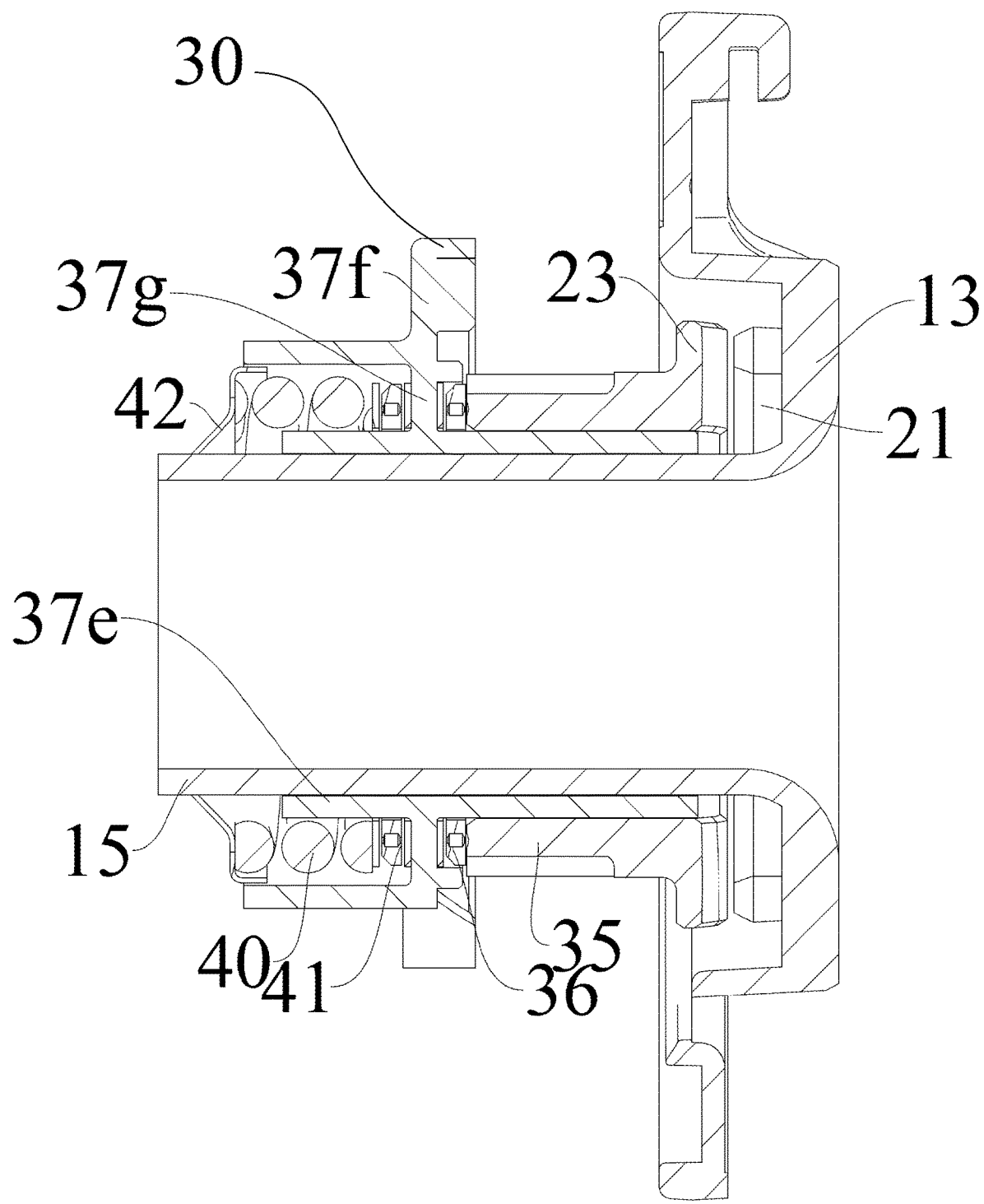
FIG. 10 is a partial schematic diagram of an entire actuator connected by a mounting shaft according to an embodiment of the present disclosure.
Figure 11:
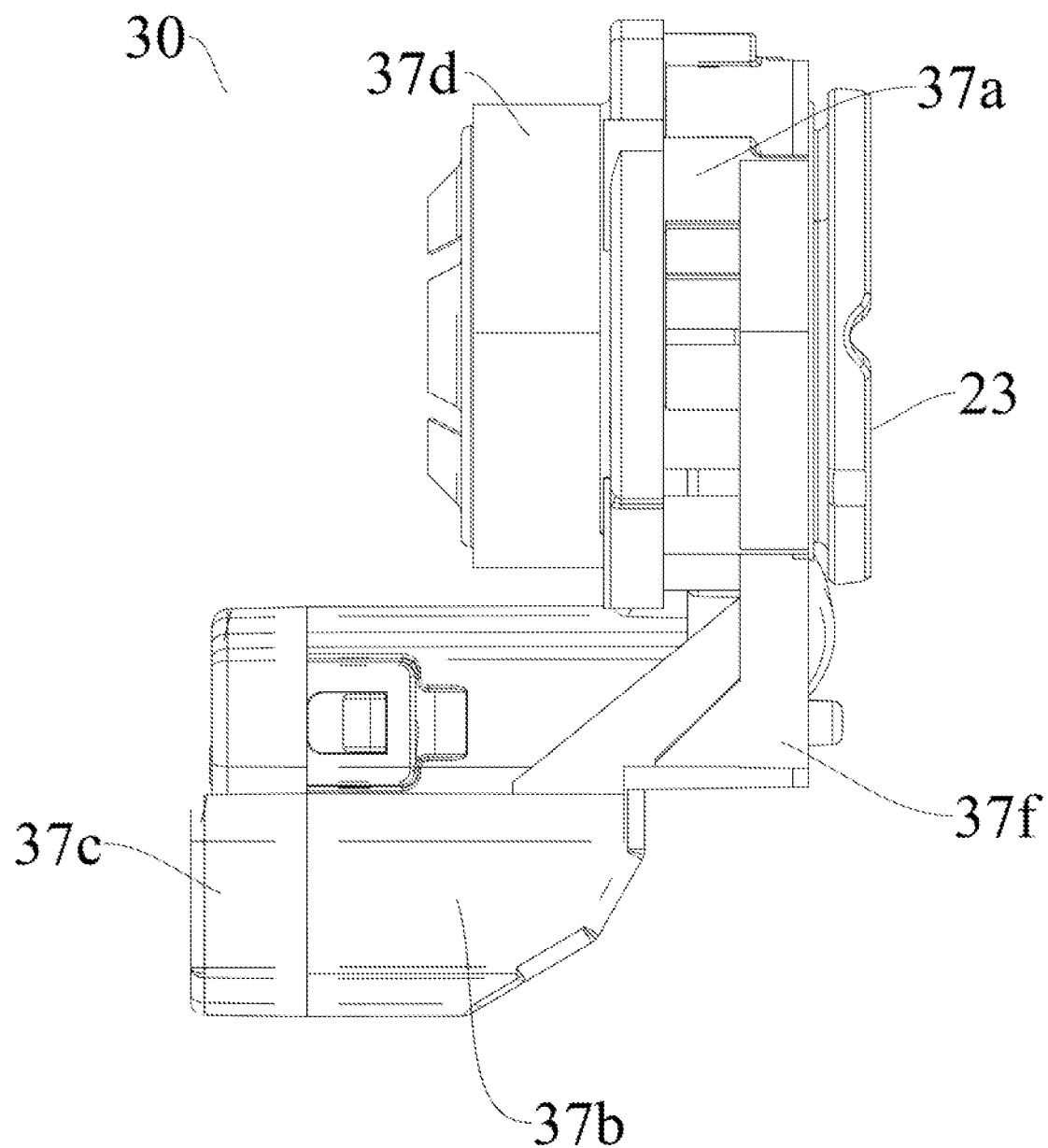
FIG. 11 is a side view of a drive unit according to an embodiment of the present disclosure after assembling.

As shown in FIG. 10, the elastic member 40 may be sleeved on the mounting shaft 15, and an axial limiting member 42 is fixed on the mounting shaft 15. The axial limiting member 42 may be a snap ring. One end of the elastic member 40 is pressed against the axial limiting member 42, and the other end of the elastic member 40 is pressed against the drive unit 30. An axial fixed connection between the axial limiting member 42, the mounting shaft 15, and the rotating turntable 13 limits an axial length of a system. In this way, specific positive pressure can be maintained between the components connected in series (the pressure is provided by the elastic member 40 through compressed deformation). The components connected in series include: a rotating turntable 13 and a clutch unit 20 to implement a locking function of the system. All of the components are also axially limited herein.

In some embodiments, as shown in FIG. 10, the other end of the elastic member 40 is pressed against the housing of the drive unit 30 through an elastic member end bearing 41. The elastic member end bearing 41 may be a thrust bearing. Therefore, when the display terminal 200 rotates, the housing of the drive unit 30 does not move, and the mounting shaft 15 rotates. The elastic member end bearing 41 can significantly reduce a friction between the elastic member 40 and the housing of the drive unit 30. The housing of the drive unit 30 has an axial limiting portion 37g. An annular mounting slot is formed at the axial limiting portion 37g. The elastic member end bearing 41 is mounted in the mounting slot and is pressed against one side surface (a bottom wall of the mounting slot) of the axial limiting portion 37g. A part of the elastic member 40 is also located in the mounting slot, so that the entire actuator 100 has a short axial length. The first groove 13a and the second groove 13b of the rotating turntable and the cavity structure 11a of the mounting bracket 11 are also combined with the mounting slot, so that a layout of the whole mechanism is more compact and proper and a connection is tighter.

In addition to this solution, a method for obtaining the positive pressure may also be limiting by using an axial limiting portion 37g at one end and riveting or tightening by using a rand or a nut at one end.

A structure of the drive unit 30 of the actuator 100 in this embodiment of the present disclosure is described below.

Figure 13:
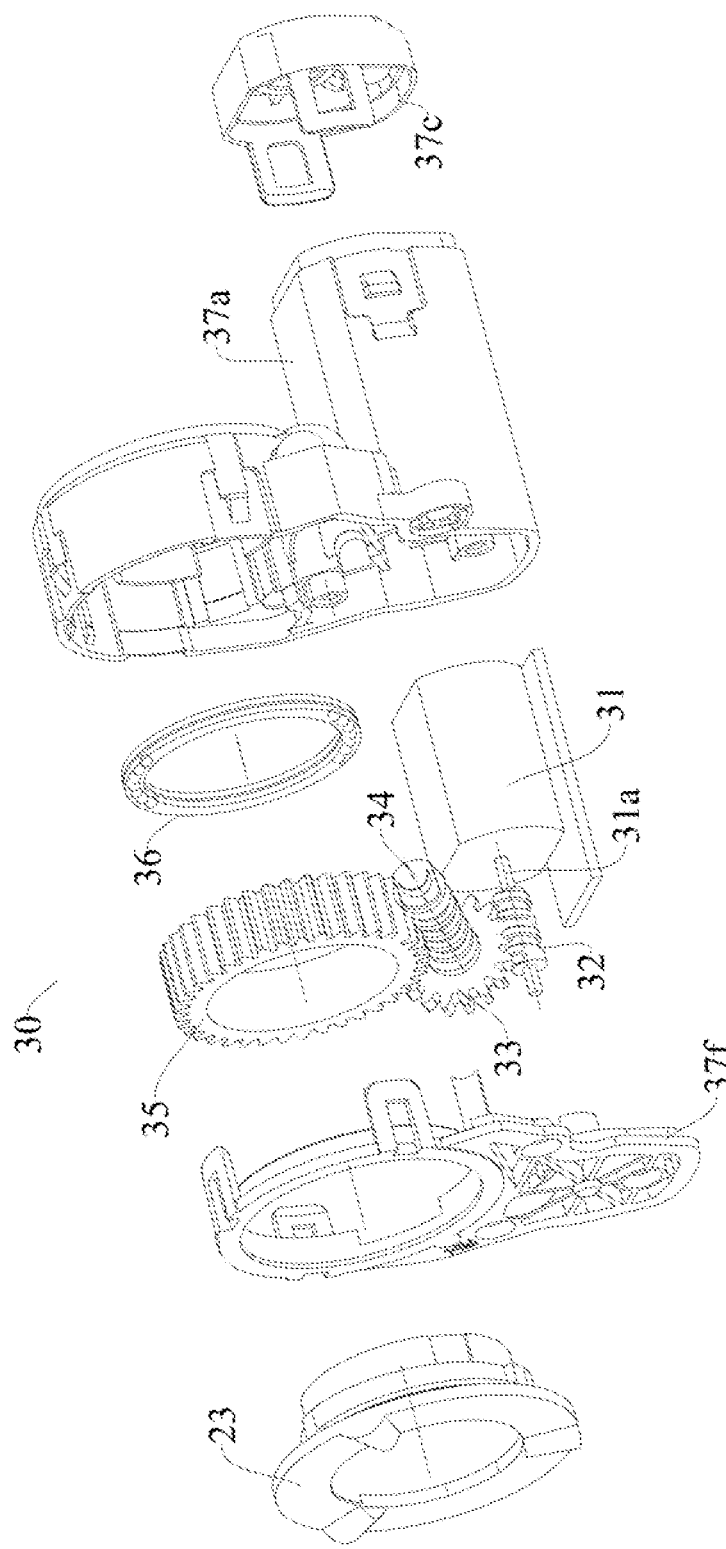
FIG. 13 is an exploded view of a drive unit according to another embodiment of the present disclosure.

As shown in FIG. 12 and FIG. 13, the drive unit 30 includes: a power source 31 and a speed reducer. An output shaft of the drive unit may be an output shaft 31a of the power source 31 or an output end of the speed reducer. The output shaft 31a of the power source 31 is connected to an input end of the speed reducer, and an output end of the speed reducer is connected to the mounting unit 10, or is connected to the second engaging portion 23. The mounting unit 10 is driven through the second engaging portion 23 and the first engaging portion 21.

The power source 31 may be a motor, an oil pump, an air pump, etc. The speed reducer may be a gear reducer or a belt drive reducer, or may be a worm gear transmission mechanism, etc. The speed reducer may be a one-stage reducer mechanism or a multi-stage reducer mechanism.

As shown in FIG. 12 to FIG. 17, the drive unit 30 for driving movement of the display terminal includes: a power source 31 and a speed reducer. The speed reducer includes a driving worm and a driven spur gear. The driving worm is connected to an output shaft 31a of the power source 31, and the driven spur gear is engaged with the driving worm.

The worm-spur gear reducer mechanism is compact, small in size, light in weight, stable in transmission, and low in noise. The entire reducer mechanism has a flexible layout, facilitates wiring, more meets requirements of a compact vehicle structure and a limited vehicle weight, and also provides users with better driving experience.

Figure 16:
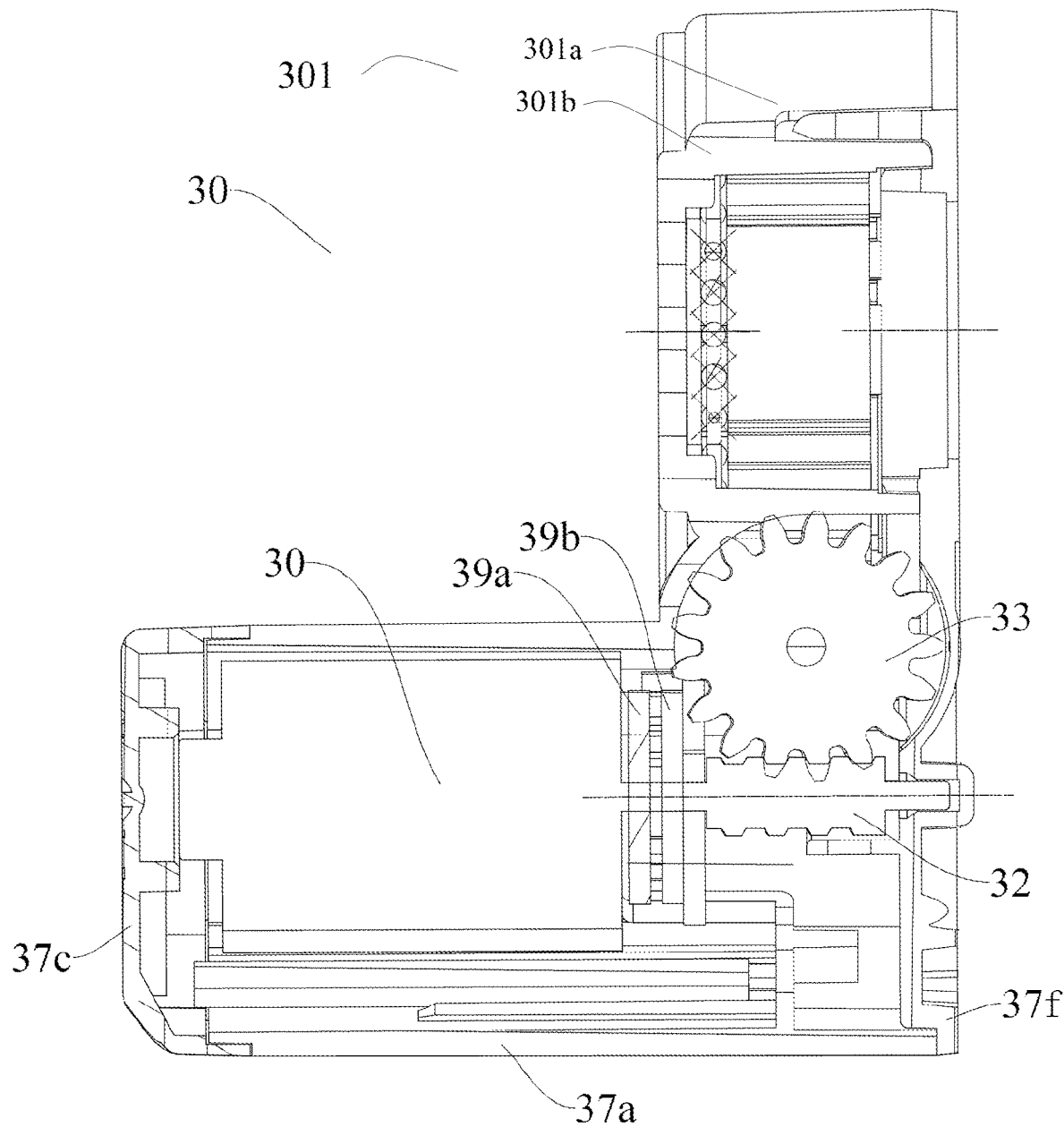
FIG. 16 is a schematic structural diagram of a drive unit according to another embodiment of the present disclosure.
Figure 17:
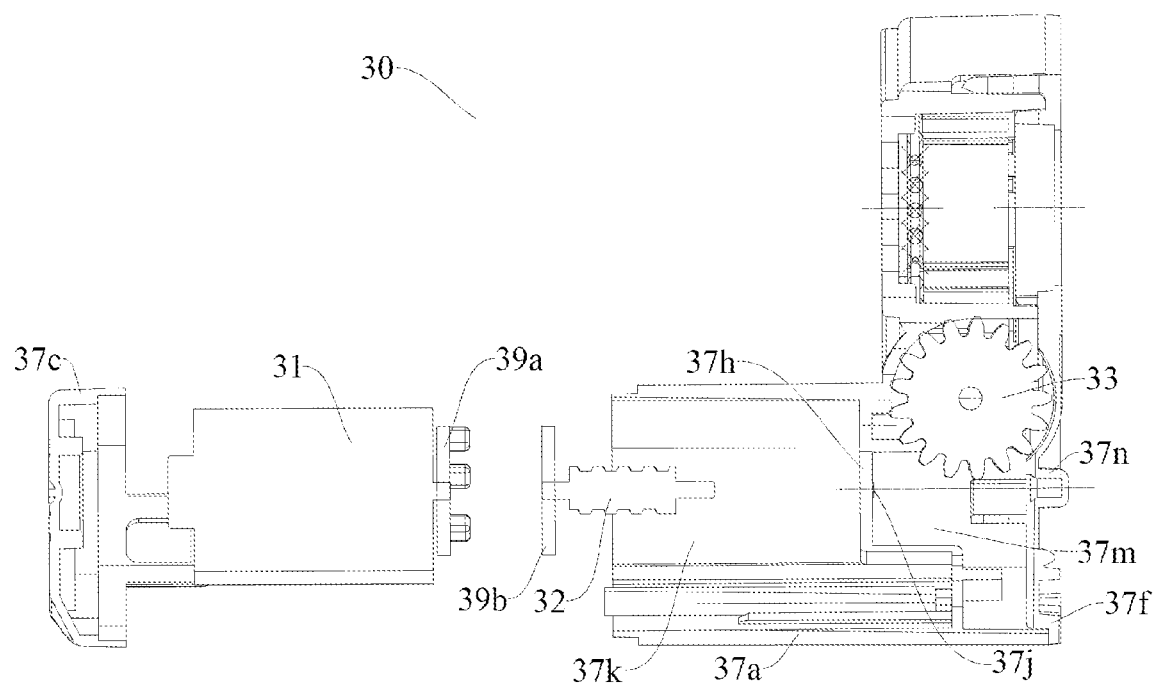
FIG. 17 is an exploded view of a drive unit according to another embodiment of the present disclosure.

As shown in FIG. 16 and FIG. 17, the output shaft 31a of the power source 31 and the driving worm of the speed reducer may be detachably connected through a coupler. The driving worm is pivotally mounted on the housing of the drive unit 30, and is positioned to match the housing of the drive unit 30 in an axial direction of the driving worm. In other words, the driving worm cannot move relative to the housing of the drive unit 30 in the axial direction (without consideration of an assembling gap).

It may be understood that the power source 31 outputs a rotational speed to the driving worm through the coupler. When the power source 31 is damaged, the power source 31 needs to be disassembled through merely the coupler. Since the driving worm is axially positioned on the housing of the drive unit 30, when the power source 31 is disassembled, engagement between the driving worm and a gear in the speed reducer is not affected. In addition, the power source 31 and the speed reducer may be mounted and fixed separately, so that impact of vibration of the power source 31 on the components in the speed reducer can be weakened, preventing the driving worm from swinging.

According to the drive unit 30 for driving the in-vehicle display terminal in this embodiment of the present disclosure, the coupler is disposed, so that engagement stability of the components in the speed reducer can be improved and a life of the drive unit 30 can be increased, and the power source 31 can be inspected and repaired alone without affecting engagement between the worm and the gear.

As shown in FIG. 17, the coupler includes: a first sub-coupler 39a and a second sub-coupler 39b. The first sub-coupler 39a is fixedly connected to the output shaft 31a of the power source 31, the second sub-coupler 39b is fixedly connected to the driving worm, and the second sub-coupler 39b is detachably connected to the first sub-coupler 39a.

During assembling, the first sub-coupler 39a and the second sub-coupler 39b approach each other along an axial direction for assembling. After the assembling is completed, the first sub-coupler 39a and the second sub-coupler 39b are fixed along a circumferential direction so as to be able to transmit a torque. During disassembling, the first sub-coupler 39a and the second sub-coupler 39b move away from each other along the axial direction for disassembling, so that the driving worm is not affected during the disassembling. In some embodiments, the first sub-coupler 39a and the second sub-coupler 39b are engaged by using inserting teeth. For example, a plurality of inserting teeth are provided on the first sub-coupler 39a, and a plurality of inserting slots are provided on the second sub-coupler 39b. The inserting teeth are in one-to-one correspondences with the inserting slots. During disassembling, merely the inserting teeth need to be disengaged from the inserting slots for disassembling the first sub-coupler 39a and the second sub-coupler 39b.

An axial limiting support structure is provided on housing of the drive unit 30. The driving worm is supported by the axial limiting support structure, and a shaft shoulder of the driving worm is opposite to an end surface of the axial limiting support structure to achieve axial positioning.

As shown in FIG. 16 and FIG. 17, the housing of the drive unit 30 includes: a housing body 37a, a front housing cover 37f, and a rear housing cover 37c.

The housing body 37a defines a first cavity 37k and a second cavity 37m. The first cavity 37k and the second cavity 37m are isolated by a partition 37h. The power source 31 is mounted in the first cavity 37k, and the driving worm is mounted in the second cavity 37m. An avoidance hole 37j is provided on the partition 37h. The driving worm protrudes into the first cavity 37k through the avoidance hole 37j and is detachably connected to the output shaft 31a of the power source 31. An axial limiting support structure may be provided on the partition 37h at the avoidance hole 37j. The partition 37h is configured to obtain two mounting cavities, and can axially limit the driving worm to prevent the driving worm from shaking during disassembling of the power source 31. An end of the first cavity 37k facing away from the second cavity 37m is open. The rear housing cover 37c is connected to the housing body 37a to cover the open end of the first cavity 37k, and the front housing cover 37f is connected to the housing body 37a to cover an open end of the second cavity 37m. The coupler is mounted in the first cavity 37k, and a shaft sleeve 37n is provided on the front housing cover 37f. The driving worm is supported in the shaft sleeve 37n, and the shaft shoulder of the driving worm is opposite to an end surface of the shaft sleeve 37n.

When the power source 31 needs to be repaired, the rear housing cover 37c is disassembled, and the power source 31 and the first sub-coupler 39a are disassembled from the second sub-coupler 39b as a whole. During the disassembling, the engagement between the driving worm and the driven spur gear is not affected, so that tooth breaking can be avoided during subsequent use.

An included angle between an axis of the driving worm and an axis of the driven spur gear is an acute angle. The included acute angle between the axis of the driving worm and the axis of the driven spur gear is $\alpha$, which satisfies the following: $82°\leq\alpha\leq88°$. In some embodiments, $84°\leq\alpha\leq86°$. For example, $\alpha=85°$. A value of $\alpha$ is determined according to a helix angle of the driving worm.

In other words, the driving worm and the driven spur gear are not perpendicular to each other, so that it can be ensured that the driving worm and the driven spur gear are well engaged and that transmission efficiency is higher. The spur gear is easily processed. Gear-worm transmission in the related art is improved to gear-spur gear transmission, so as to avoid poor processing performance of a gear.

Figure 14:
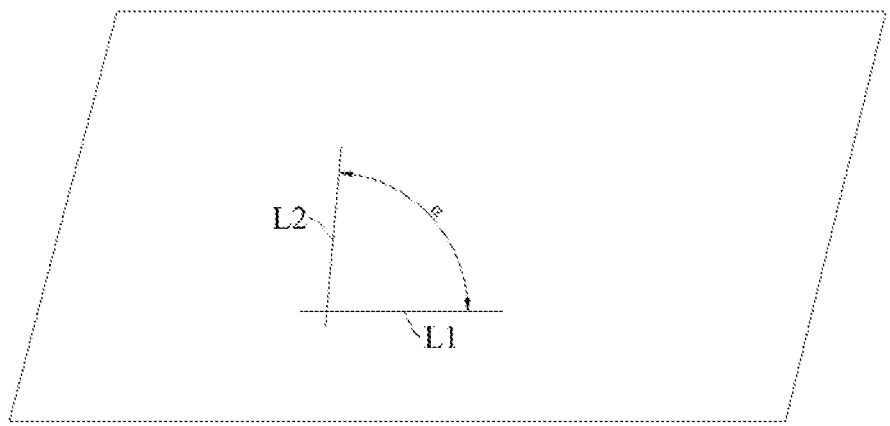
FIG. 14 and FIG. 15 respectively show schematic diagrams of an angle α and an angle β.

In some embodiments, the speed reducer is a one-stage transmission mechanism, and includes: a first-stage driving worm and a first-stage driven spur gear. The first-stage driving worm is connected to the output shaft 31a of the power source 31. The output shaft 31a of the power source 31 and the first-stage driving worm may be fixedly connected, or may be detachably connected through a coupler. The first-stage driving worm is engaged with the first-stage driven spur gear, and an included angle between an axis of the first-stage driving worm and an axis of the first-stage driven spur gear is an acute angle. As shown in FIG. 14, the axis L1 of the first-stage driving worm and the axis L2 of the first-stage driven spur gear are projected onto a projection plane parallel to the two axes, to obtain an included angle $\alpha$ between the axis of the first-stage driving worm and the axis of the first-stage driven spur gear, which satisfies the following: $82°\leq\alpha\leq88°$. In some embodiments, $84°\leq\alpha\leq86°$. For example, $\alpha=85°$. A value of $\alpha$ is determined according to a helix angle of the first-stage driving worm. In other words, the first-stage driving worm and the first-stage driven spur gear are not perpendicular to each other, so that it can be ensured that the first-stage driving worm and the first-stage driven spur gear are well engaged and that transmission efficiency is higher. The spur gear is easily processed. Gear-worm transmission in the related art is improved to gear-spur gear transmission, so as to avoid poor processing performance of a gear.

In other embodiments, as shown in FIG. 12 and FIG. 13, the speed reducer is a second-stage transmission mechanism, and includes: a first-stage driving worm 32, a first-stage driven spur gear 33, a second-stage driving worm 34, and a second-stage driven spur gear 35. An output end of the speed reducer may be the second-stage driven spur gear 35.

The output shaft 31a of the power source 31 is connected to the first-stage driving worm 32, and the first-stage driving worm 32 may be integrated outside the output shaft 31a of the power source 31. The output shaft 31a of the power source 31 and the first-stage driving worm may be fixedly connected, or may be detachably connected through a coupler.

The first-stage driving worm 32 is engaged with the first-stage driven spur gear 33, and an included angle between an axis of the first-stage driving worm 32 and an axis of the first-stage driven spur gear 33 is an acute angle. As shown in FIG. 14, the axis L1 of the first-stage driving worm and the axis L2 of the first-stage driven spur gear are projected onto a projection plane parallel to the two axes, to obtain an included angle $\alpha$ between the axis of the first-stage driving worm 32 and the axis of the driven spur gear 33, which satisfies the following: $82°\leq\alpha\leq88°$. In some embodiments, $84°\leq\alpha\leq86°$. For example, $\alpha=85°$. A value of $\alpha$ is determined according to a helix angle of the first-stage driving worm 32. In other words, the first-stage driving worm 32 and the first-stage driven spur gear 33 are not perpendicular to each other, so that it can be ensured that the first-stage driving worm 32 and the first-stage driven spur gear 33 are well engaged and that transmission efficiency is higher. The spur gear is easily processed. Gear-worm transmission in the related art is improved to gear-spur gear transmission, so as to avoid poor processing performance of a gear.

The second-stage driving worm 34 and the first-stage driven spur gear 33 are coaxially disposed, and the second-stage driving worm 34 and the first-stage driven spur gear 33 are axially spaced apart. The second-stage driving worm 34 and the first-stage driven spur gear 33 may be integrally processed, or the first-stage driven spur gear 33 may be connected to the second-stage driving worm 34 through a spline.

Figure 15:
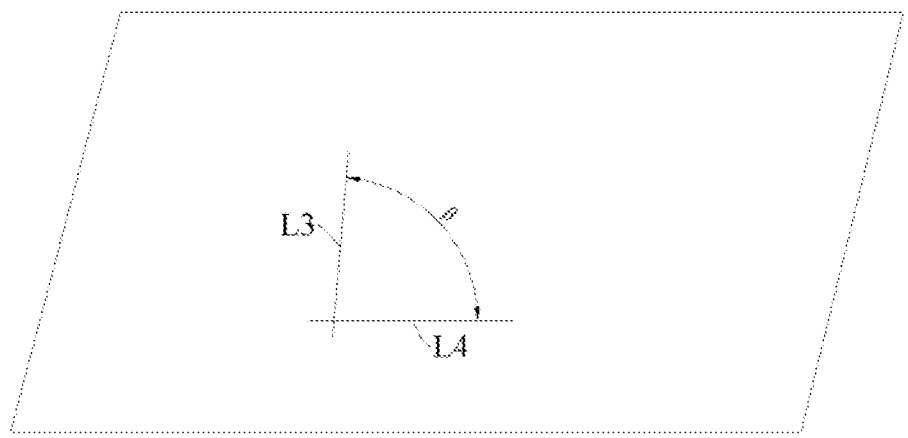

The second-stage driven spur gear 35 is engaged with the second-stage driving worm 34, and the second-stage driven spur gear 35 is configured to output a drive force of the drive unit 30. An included angle between an axis of the second-stage driving worm 34 and an axis of the second-stage driven spur gear 35 is an acute angle. As shown in FIG. 15, the axis L3 of the second-stage driving worm 34 and the axis L4 of the second-stage driven spur gear 35 are projected onto a projection plane parallel to the two axes, to obtain an included angle $\beta$ between the axis of the second-stage driving worm 34 and the axis of the second-stage driven spur gear 35, which satisfies the following: $82°\leq\beta\leq88°$. In some embodiments, $84°\leq\beta\leq86°$. For example, $\beta=85°$. A value of $\beta$ is determined according to a helix angle of the second-stage driving worm 34. In other words, the second-stage driving worm 34 and the second-stage driven spur gear 35 are not perpendicular to each other, so that it can be ensured that the second-stage driving worm 34 and the second-stage driven spur gear 35 are well engaged and that transmission efficiency is higher. The spur gear is easily processed. Gear-worm transmission in the related art is improved to gear-spur gear transmission, so as to avoid poor processing performance of a gear.

The axis of the first-stage driving worm 32, the axis of the second-stage driven spur gear 35, and the axis of the clutch unit 20 are parallel. An axis of the output shaft 31a of the power source 31 and the axis of the second-stage driven spur gear 35 are parallel and spaced apart. In this way, an arrangement direction of the power source 31 can be parallel to an output direction of the drive unit 30, facilitating assembly designing.

When the power source 31 is idle, a self-locking function of the worm (self-locking can be triggered when the helix angle of the worm is less than a friction angle), a clutch function of the whole solution can be achieved, that is, during manual operation, the speed reducer is self-locked, so that the second engaging portion 23 is fixed, and the first engaging portion 21 can perform relative rotation.

The worm-spur gear reducer mechanism is compact, small in size, light in weight, stable in transmission, and low in noise. The entire reducer mechanism has a flexible layout, facilitates wiring, more meets requirements of a compact vehicle structure and a limited vehicle weight, and also provides users with better driving experience.

The first-stage driven spur gear 33 transmits high-speed rotation of the first-stage driving worm 32 to the second-stage driving worm 34. In order to reduce vibration during the transmission, the first-stage driven spur gear 33 may be a plastic member, and the first-stage driving worm 32, the second-stage driving worm 34, and the second-stage driven spur gear 35 are metal members.

The second-stage driven spur gear 35 is connected to the second engaging portion 23 to achieve power output. For example, the second-stage driven spur gear 35 is integrated with the second engaging portion 23. According to functional requirements, the second-stage driven spur gear 35 and the second engaging portion 23 may be made of different materials. The second-stage driven spur gear 35 is made of wear-resistant materials, and the second engaging portion 23 is made of self-lubricating materials, such as polyoxymethylene, molybdenum disulfide, or boron nitride, etc.

As shown in FIG. 12 and FIG. 13, the drive unit 30 may further include: an output interface connected to the second-stage driven spur gear 35. The output interface is configured to output a drive force, and the output interface may be the second engaging portion 23 of the clutch unit 20.

The output interface and the second-stage driven spur gear 35 both are hollow rings.

Hollow shapes of the first engaging portion 21, the second engaging portion 23, and the second-stage driven spur gear 35 are used for facilitating wiring and reducing a weight. In addition, a torque input end and a torque output end are not on the same axis. A hollow shaft and a transmission system can cause an input shaft and an output shaft to be parallel shaft directions, facilitating spatial planning of the structure and providing a larger design margin.

The first-stage driving worm 32 is fixedly connected to a motor shaft. One end protrudes from the motor and the other end is restricted by the housing structure. The first-stage driven spur gear 33 and the second-stage driving worm 34 are fixed on the same shaft. Due to a limited space, shaft sleeves with shoulders are used at two ends instead of bearings. The shaft sleeve has lubricating oil inside. The second-stage driven spur gear 35 is also limited by the housing structure. One end is integrated with the output structure, and the other end is born by an end bearing. Both the sleeve and the end bearing reduce friction losses during rotation and reduce the generated frictional heat.

The second-stage driven spur gear 35 may be a hollow gear, not only reducing a weight of the entire drive unit 30, but also facilitating assembling.

As shown in FIG. 3, FIG. 12, and FIG. 13, the housing of the drive unit 30 includes: a housing body 37a, a rear housing cover 37c, an upper housing cover 37d, and a front housing cover 37f.

All of the power source 31, the first-stage driving worm 32, the first-stage driven spur gear 33, and the second-stage driving worm 34 are mounted on the housing body 37a, the second-stage driven spur gear 35 is mounted on the upper housing cover 37d, the first-stage driven spur gear 33 and the second-stage driving worm 34 are fixed on the same shaft, and the first-stage driven spur gear 33 and the second-stage driving worm 34 are coaxially disposed.

As shown in FIG. 12, the housing body 37a is a plastic member, and the upper housing cover 37d is a metal member. It may be understood that the housing body 37a mainly bears high-speed components, and the plastic members facilitate shock absorption. The upper housing cover 37d mainly bears low-speed components and is formed integrally.

In other embodiments, referring to FIG. 13, the housing body 37a and the upper housing cover 37d are integrally formed.

The rear housing cover 37c is connected to the housing body 37a to cover a rear end of the housing body 37a. The upper housing cover 37d is connected to the housing body 37a, and the front housing cover 37f is connected to the housing body 37a to cover a front end of the housing body 37a. The rear housing cover 37c, the upper housing cover 37d, the front housing cover 37f, and the housing body 37a may be connected by using a buckling structure and a threaded fastener.

In the entire system of the drive unit 30, the housing receives an impact load, and the second engaging portion 23 receives axial positive pressure and a circumferential torque during rotation, which are transmitted to the housing. Therefore, in order to guarantee stability of the drive unit 30, in addition to screwing and buckling connections between the components, the drive unit 30 is fastened to the base 50 in the actuator 100 by using screws, so as to increase the strength and a service life of the drive unit 30.

The housing of the drive unit 30 has an axial limiting portion. An end surface of the second-stage driven spur gear 35 facing away from the display terminal 200 is pressed against the axial limiting portion, and an end surface of the second-stage driven spur gear 35 facing away from the second engaging portion 23 is pressed against the axial limiting portion. In some embodiments, the upper housing cover 37d may have an axial limiting portion 37g for limiting the end surface of the second-stage driven spur gear 35, so that an end surface of the second-stage driven spur gear 35 is connected to the second engaging portion 23, and another end surface of the second-stage driven spur gear 35 is pressed against the upper housing cover 37d, thereby guaranteeing axial positioning of the second-stage driven spur gear 35 and avoiding tooth breaking of the second-stage driven spur gear 35 and the second-stage driving worm 34.

The second-stage driven spur gear 35 is pressed against the axial limiting portion 37g through a gear end bearing 36. The gear end bearing 36 may be a thrust bearing. In this way, a friction between the second-stage driven spur gear 35 and the housing of the drive unit 30 can be reduced, reducing torque losses. In another structure, an annular groove may be provided on the upper housing cover 37d for assembling the gear end bearing 36.

An annular groove may be provided on the end surface of the second-stage driven spur gear 35 facing away from the second engaging portion 23. The gear end bearing 36 is provided in the annular groove, and is pressed against a bottom wall of the annular groove. At least a part of the axial limiting portion 37g protrudes into the annular groove. In some embodiments, a deep groove shape may be provided in the axial limiting portion 37g. An end surface of the axial limiting portion 37g is pressed against the elastic member end bearing 41, and another end surface of the axial limiting portion 37g is pressed against the gear end bearing 36. The gear end bearing 36 is also in the annular groove of the second-stage driven spur gear 35, and at least a part of the elastic member 40 may be located in the annular groove of the second-stage driven spur gear 35. In this way, the axial length of the entire mechanism can be shortened, and space is saved, so that the entire mechanism is more applicable. In addition, from a point of view of structural mechanics, rigidity of the system is also enhanced, strengthening bending and torsion resistance of the system.

As shown in FIG. 3 and FIG. 12, the upper housing cover 37d has a sleeve 37e. The second-stage driven spur gear 35 is sleeved on the sleeve 37e, and the axial limiting portion 37g is located on an outer peripheral surface of the sleeve 37e.

Figure 19:
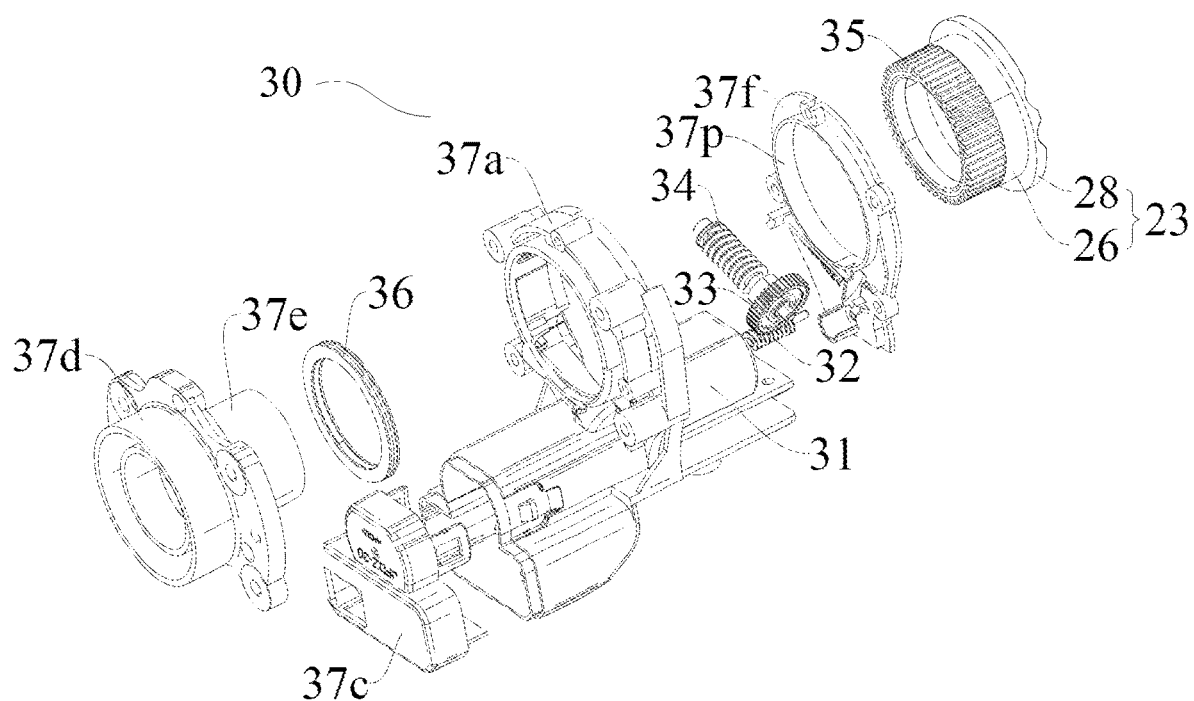
FIG. 19 is an exploded view of a drive unit according to an embodiment of the present disclosure (a radial holding mechanism is shown)

As shown in FIG. 1, FIG. 3, and FIG. 19, the housing of the drive unit 30 has a radial holding mechanism 301. The second engaging portion 23 is relatively rotatably provided on the radial holding mechanism 301 for limiting in a radial direction. The radial holding mechanism 301 is configured to prevent a radial bias of at least some of the rotating components to prevent the actuator 100 from being radially biased during operation, so that the actuator 10 can still operate stably after long-term operation.

In some embodiments, the housing of the drive unit 30 remains stationary after being mounted on the vehicle body. The housing of the drive unit 30 has two hollow rings disposed in a sleeving manner: an outer ring 301a and an inner ring 301b. The radial holding mechanism 301 includes the outer ring 301a and the inner ring 301b. The outer ring is sleeved on the inner ring, and the outer ring and the inner ring define an annular cavity. At least a part of the second engaging portion 23 is provided in the annular cavity, and at least a part of the second engaging portion 23 is sleeved on the inner ring. The inner ring is configured to prevent the second engaging portion 23 from being biased radially inward. The outer ring is sleeved on at least a part of the second engaging portion 23, and is configured to prevent the second engaging portion 23 from being biased radially outward.

In some embodiments, as shown in FIG. 19, the housing of the drive unit 30 includes: A housing body 37a, an upper housing cover 37d, and a front housing cover 37f. The upper housing cover 37d is connected to the housing body 37a, and has an annular sleeve 37e. The front housing cover 37f is connected to a front end of the housing body 37a, and has an annular limiting ring 37p. The limiting ring 37p is sleeved on the sleeve 37e to define an annular cavity. In other words, an inner diameter of the limiting ring 37p is greater than an inner diameter of the sleeve 37e. The annular cavity is located between an inner peripheral wall of the limiting ring 37p and an outer peripheral wall of the sleeve 37e. At least a part of the second engaging portion 23 is provided in the annular cavity. At least a part of the second engaging portion 23 is sleeved on the sleeve 37e. The sleeve 37e is configured to prevent the second engaging portion 23 from being biased radially inward. The limiting ring 37p is sleeved on at least a part of the second engaging portion 23, and is configured to prevent the second engaging portion 23 from being biased radially outward.

An output end of the drive unit 30 includes an annular output gear. The output gear may be the second-stage driven spur gear 35 in the above embodiment. The output gear is connected to the second engaging portion 23, and the output gear is sleeved on the sleeve 37e. As shown in FIG. 19, the second engaging portion 23 includes an engaging pad 28 to be locked with the first engaging portion 21 and a connecting sleeve 26 connected to an end of the engaging pad 28 facing away from the first engaging portion 21. The connecting sleeve 26 is connected to the output gear, and the limiting ring 37p is sleeved on the connecting sleeve 26. In this way, radial inner and outer sides of the output gear are also respectively limited by the sleeve 37e and the limiting ring 37p. The output end of the drive unit 30 is unlikely to be affected by external vibration during working, avoiding tooth breaking.

The radial holding mechanism 301 may also include a radial limiting bearing (not shown). A radial limiting bearing is provided between the limiting ring 37p and at least a part of the second engaging portion 23. For example, a radial limiting bearing may be provided between the limiting ring 37p and the connecting sleeve 26. In this way, an inner ring of the radial limiting bearing is pressed against the connecting sleeve 26, and an outer ring of the radial limiting bearing is pressed against the limiting ring 37p, so that the radial holding mechanism 301 is radially limited more stably.

The mounting unit 10 includes: a mounting shaft 15 penetrating the clutch unit 20 and the drive unit 30. The sleeve 37e is sleeved on the mounting shaft 15. The sleeve 37e can radially limit the mounting shaft 15 at an outer side, thereby further enhancing radial stability of the rotating turntable 13.

The drive unit 30 in this patent can adopt a planetary gear train or a two-stage worm and a spur gear transmission system, so that the system has the following advantages: 1) The system has a compact structure, a small size, and a light weight. 2) The system has stable transmission, low noise, a high transmission ratio, and an obvious deceleration effect. 3) The system has a flexible layout and facilitates wiring. The system more meets requirements of a compact vehicle structure and a limited vehicle weight, and also provides users with better driving experience. 4) The dedicated in-position locking system in this patent can effectively isolate an internal transmission system of the drive unit 30 from external impact, so that not only micro-vibration and whirling of the display terminal 200 caused by an internal backlash of the transmission system is avoided, improving the stability and anti-shake and anti-vibration performance of the system, but also damage to the transmission system caused by external impact is avoided, improving reliability and a service life of the system. 5) The present disclosure is mainly used for a rotating mechanism of the display terminal 200. The present disclosure is also applicable to other electronic products with rotating requirements. 6) As described above, the components are connected by using the mounting shaft 15 in the axial direction. A series of components cause error accumulation (a production error and an assembling error). The pitch can be eliminated to a large extent through spring compression to reduce the error. Other improvement measures are to shorten an axial matching size. An appropriate position is found from a movement structure, and a groove is designed to put components such as a spring into the movement, so as to shorten an axial length of the entire mechanism to reduce a dimension chain error. 7) The axial length is reduced, and the rigidity of the entire system is also increased. Therefore, when the system is loaded by an external force, a capability of resisting bending and torsion is better, and the system is unlikely to be deformed or damaged. 8) In addition, in addition to the increased stiffness, the shorter axial length also enhances the overall stability and reduces shaking. 9) This solution focuses on achieving modular designing of automatic and manual integrated rotating mechanism. Except for the mounting bracket 11 and base 50 matching an external structure, remaining components form one complete module, which may be applied to any vehicle model or even other products that require rotating functions. The system has the same interchangeability and versatility as standard parts, greatly improving an application range of the product, and may be used in actual production.

It may be understood that automatic rotation is locked through over-current protection when the rotation is in place. For manual rotation, a rotation stroke of 90° is controlled through the locking slot 25 and the locking protrusion 27 of the clutch unit 20.

Function implementation principles are as follows.

1) Transmission route in the actuator 100 in an automatic mode: Starting from the drive unit 30, an output torque of the motor is decelerated and increased. This solution is implemented by a speed reducer. The torque is transmitted to the first engaging portion 21 through the second engaging portion 23 of the output end of the drive unit. The first engaging portion 21 transmits the torque to the rotating turntable 13 through a plurality of locking slots 25 in the circumferential direction (a boss structure corresponding to the rotating turntable 13) to drive the rotating turntable 13 to achieve planar rotation, thereby driving the mounting bracket 11 fixed on the rotating turntable and the display terminal 200 to perform planar rotation. When the rotating turntable is rotated by 90°, the limiting slot 14 on the rotating turntable 13 reaches the extremity, and is limited by the positioning pin on the drive unit 30, a rotor of the motor is locked, and a current increases. A control system detects a locked-rotor signal and a built-in gyroscope of the display terminal 200 transmits an in-position signal. The control system recognizes the fact of in place and powers off the motor. The transmission of the power system is interrupted and the system is locked in place.

2) Transfer route in a rotating system in a manual mode: In the automatic mode, the second engaging portion 23 and the first engaging portion 21 are stationary relative to each other and are rotated together. However, in the manual mode, since a worm and a spur gear inside a movement have a self-locking function, the second engaging portion 23 is locked and fixed. Therefore, only the first engaging portion 21 rotates with the rotating turntable 13, the mounting bracket 11, and the display terminal 200 as a whole. The torque transmission route is started by rotating the display terminal 200 by using hands, and passes through the mounting bracket 11 to arrive at the rotating turntable 13 and then at the first engaging portion 21. In this case, a locking function in the manual mode is implemented by a special structure of the first engaging portion 21 and the second engaging portion 23.

3) In-place locking and protecting system: An in-position locking function of the rotating mechanism system in the automatic mode is guaranteed by positive pressure provided through compression and deformation of the elastic member 40 during assembling. Sufficiently large system positive pressure between contact surfaces of various components can effectively isolate influence on the display terminal 200 caused by road impact transmitted from the base 50 to the system, effectively protecting the transmission system, thereby further improving reliability of the system.

In the automatic mode, one end of the rotating turntable 13 forms, by using an axial limiting portion 42, a retaining wall pressed against the elastic element 40, and the other end is a turntable body similar to a shaft shoulder, which together axially lock a plurality of components in the axial direction. The design can effectively avoid micro-vibration and whirling of the display terminal 200 caused by a backlash existing in the drive unit 30, avoiding visual staying caused therefrom, and avoid a risk of damaging the transmission system due to tooth breaking caused by the micro-vibration in vibration impact, guaranteeing anti-shake and anti-vibration performance of the system.

In the manual mode, effective locking of a 90° rotation stroke and avoiding of false positions are achieved through the clutch unit 20, the rotating turntable 13, and the positioning mechanism on the drive unit. Six locking slots 25 are provided on the second engaging portion 23. Three locking slots are classified into one group. An angle between two groups is slightly greater than 90°. Three locking protrusions 27 are provided on the first engaging portion 21, which may respectively match the two groups of locking slots 25 of the second engaging portion 23 at two end points of a rotation stroke. In addition, the locking slot 25 and the locking protrusion 27 have arc-shaped cross sections, not only achieving accurate positioning but also providing good hand feeling. The locking slot 25 is slightly larger than the locking protrusion 27 to reserve an appropriate pre-compression angle, so that incomplete buckling caused by manufacturing tolerances is avoided, requirements on the clutch unit 20 and position accuracy are reduced, and shaking and instability of components as a result of a pitch caused by production errors can be avoided. An oil groove 24 is provided on the end surface of the second engaging portion 23, greatly improving a frictional state of the first engaging portion 21 and the second engaging portion 23 during rotation relative to each other, improving service lives of the components, and improving hand feeling of a user to some extent during manual rotation.

From the above introductions, in the manual mode, the first engaging portion 21 and the second engaging portion 23 are key components. In the automatic mode, the two components are temporarily fastened into one body, and the drive unit 30 outputs automatic power to achieve automatic rotation. An outstanding feature of this solution is two working modes: the manual mode and the automatic mode. A proper torque threshold is designed to distinguish between the two modes. Structurally, the key component, that is, the second engaging portion 23 in the manual mode is used as the output end of the drive unit 30 to achieve coexistence of the two modes.

4) In order to improve driving experience of customers, the display terminal 200 in this system is rotated at an extremely small speed (about 6-10 r/min), which requires the drive unit 30 to have a relatively large transmission ratio of about 1500-2000. A planetary gear reducer or a double worm reducer system of a two-stage worm-spur gear may be selected according to a specific structure layout. An entire shaft is designed as a hollow structure, facilitating designing of the locking system.

5) A current-limiting circuit board is built in the rotating system, so that when a current exceeding a specified threshold is detected, the motor is powered off, so as to achieve safety anti-pinch and overload protection.

6) In place and abnormal position control: In place at 90° of the system or enabling of an anti-pinch indicator when the display terminal 200 encounters external resistance both depend on a current increase. When a design threshold of a current-limiting circuit board of the drive unit 30 is exceeded, the system powers off the motor, so that after the motor is powered off, the control system determines, based on a signal transmitted by the built-in gyroscope of the display terminal 200, whether the display terminal 200 is at an abnormal position. If the signal transmitted by the gyroscope indicates that the display terminal 200 is at a landscape position or a portrait position, it indicates that power-off of the motor is in-place power-off. Otherwise, it is determined that the display terminal 200 is at an abnormal position, and it is determined that the motor is abnormally powered off as a result of resistance. In this case, a warning screen appears to remind a customer to check for foreign objects. When the resistance disappears, restart and return are performed according to selection of the customer. Determining of an abnormal position includes manual operation in the automatic running state. For actual feedback of an abnormal position, software functions may be defined according to customer requirements and definitions. A limiting and locking structure in this solution can fully adapt to different software function definitions at a physical level (related to control of abnormal positions).

7) The hollow designs of the rotating turntable 13 and the mounting shaft 15 facilitate wiring, so that wiring behind a screen is proper and beautiful, and a wire outlet has a relatively large rounded corner, also preventing cutting.

8) This system is a centering rotating system, that is, a rotation center remains unchanged during rotation. Therefore, the mounting bracket 11 with a unified interface may be used to achieve matching and compatibility between terminals of a plurality of sizes. In this way, versatility of products is improved, costs are reduced, and quality control is convenient.

9) The display terminal 200 of the system is suspended in a central control, so that an instrument table is more tidy and beautiful.

This patent relates to an actuator 100 of a display terminal 200 that can achieve manual and automatic rotation of the display terminal 200. The actuator 100 can implement the following functions: 1) automatically switching the display terminal 200 between a landscape mode and a portrait mode; 2) providing two rotation modes: a manual rotation mode and an automatic rotation mode to enhance user experience; 3) automatic positioning locking after rotation in place; 4) anti-shake and anti-vibration of the system; 5) overload protection and safety anti-pinch; and 6) matching and compatibility and strong adaptability between terminals of a plurality of sizes.

It should be noted that the above various embodiments of the mounting unit 10, the clutch unit 20, and the drive unit 30 may be combined with each other to form more embodiments of the actuator 100 without conflict.

The present disclosure further discloses a vehicle 1000.

Figure 20:
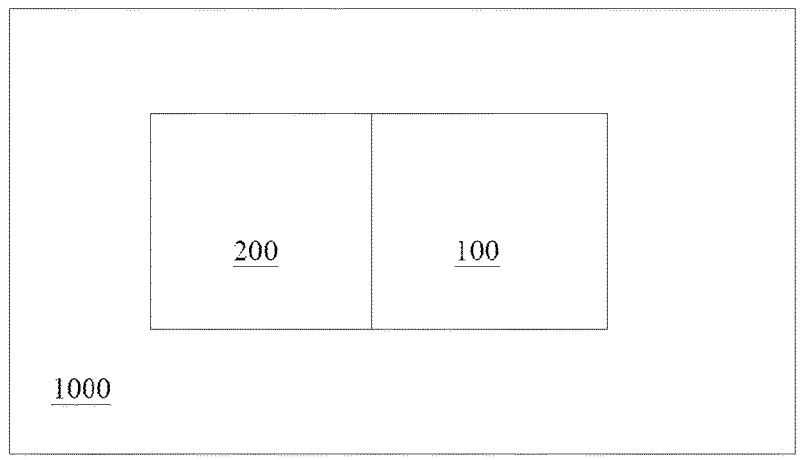
FIG. 20 is a schematic structural diagram of a vehicle according to an embodiment of the present disclosure.

As shown in FIG. 20, the vehicle 1000 in an embodiment of the present disclosure includes: a display terminal 200 and any of the above actuators 100. The display terminal 200 is mounted on the mounting unit 10 of the actuator 100, and the actuator 100 is mounted on a vehicle body. For example, the housing of the drive unit 30 may be mounted on the vehicle body through the base 50. A rotation axis of the display terminal 200 may be a direction X (a front-to-rear direction), and the display terminal 200 may be an in-vehicle display terminal, such as a display panel mounted on a dashboard.

In this way, the display terminal 200 of the vehicle 1000 in this embodiment of the present disclosure can be used at a plurality of angles. For example, the display terminal may be switched between a landscape mode and a portrait mode manually or automatically.

An actuator for adjusting a display terminal is provided, including: a mounting unit configured to mount a display terminal; a clutch unit, a first engaging portion of the clutch unit being connected to the mounting unit, and a second engaging portion of the clutch unit being normally interlocked with the first engaging portion; and a drive unit, an output end of the drive unit being connected to the second engaging portion.

In some embodiments, the clutch unit is located outside a housing of the drive unit.

In some embodiments, at least a part of the clutch unit is located in the mounting unit.

In some embodiments, the mounting unit includes a rotating turntable configured to mount the display terminal and connected to the first engaging portion, an end of the rotating turntable facing the first engaging portion having a first groove, at least a part of the first engaging portion being located in the first groove.

In some embodiments, at least a part of the second engaging portion is located in the first groove.

In some embodiments, the mounting unit includes a rotating turntable configured to mount the display terminal and integrally formed with the first engaging portion.

In some embodiments, the housing of the drive unit has a radial holding mechanism, the second engaging portion being relatively rotatably provided on the radial holding mechanism for limiting in a radial direction.

In some embodiments, the housing of the drive unit has two hollow rings disposed in a sleeving manner: an outer ring and an inner ring. The radial holding mechanism includes the outer ring and the inner ring. The outer ring and the inner ring define an annular cavity. At least a part of the second engaging portion is provided in the annular cavity.

In some embodiments, the housing of the drive unit includes: a housing body, an upper housing cover, and a front housing cover, the upper housing cover being connected to the housing body and having an annular sleeve, and the front housing cover being connected to a front end of the housing body and having an annular limiting ring, the limiting ring being sleeved on the sleeve to define an annular cavity, at least a part of the second engaging portion being provided in the annular cavity.

In some embodiments, a radial limiting bearing is provided between the limiting ring and at least the part of the second engaging portion.

In some embodiments, the output end of the drive unit includes an annular output gear connected to the second engaging portion and sleeved on the sleeve.

In some embodiments, the second engaging portion includes an engaging pad to be locked with the first engaging portion and a connecting sleeve connected to an end of the engaging pad facing away from the first engaging portion, the connecting sleeve being connected to the output gear, and the limiting ring being sleeved on the connecting sleeve.

In some embodiments, the mounting unit includes: a mounting shaft penetrating the clutch unit and the drive unit. The sleeve is sleeved on the mounting shaft.

In some embodiments, the first engaging portion and the second engaging portion are engaged with each other and have a plurality of engaging positions, and the mounting unit is configured to be manually rotatable to drive the first engaging portion to rotatably switch between the plurality of engaging positions relative to the second engaging portion.

In some embodiments, when the engaging position is changed, the second engaging portion and the drive unit remain stationary relative to each other in the axial direction, and the first engaging portion moves away from the second engaging portion in the axial direction.

In some embodiments, a plurality of engaging positions are formed on end surfaces of the first engaging portion and the second engaging portion opposite to each other.

In some embodiments, the end surfaces of the first engaging portion and the second engaging portion are opposite to each other, one of the two end surfaces facing each other has a plurality of locking slots, and the other has at least one locking protrusion, each of the locking protrusions being adapted to be engaged with at least two of the locking slots so that the second engaging portion and the first engaging portion are adapted to be engaged at least at two of the engaging positions.

In some embodiments, the mounting unit includes a rotating turntable configured to mount the display terminal, the end surface of the first engaging portion being configured as an end surface of the rotating turntable facing the second engaging portion, and the locking protrusion being formed on the end surface of the first engaging portion.

In some embodiments, the locking protrusion is detachably connected to the rotating turntable.

In some embodiments, both the locking slot and the locking protrusion have an arc-shaped cross section.

In some embodiments, the first engaging portion and the second engaging portion both are circular, and the locking slot and the locking protrusion both are an annular sector concentric with the first engaging portion or the second engaging portion.

In some embodiments, at least one side of the locking protrusion is pressed against a corresponding side of the locking slot so that the locking protrusion is engaged with the locking slot.

In some embodiments, a width of at least a part of the locking protrusion is greater than a width of an open end of the locking slot.

In some embodiments, a width of the locking slot gradually decreases from the open end to a bottom, the width of the locking protrusion gradually decreases from a root to a top, and the width of the open end of the locking slot is less than a width of the root of the locking protrusion.

In some embodiments, a depth of the locking slot is less than a height of the locking protrusion.

In some embodiments, there are the same number of locking slots and locking protrusions arranged at even intervals along a circumferential direction.

In some embodiments, there are respectively three locking slots and locking protrusions.

In some embodiments, the locking slot and the locking protrusion are in clearance fit in the circumferential direction.

In some embodiments, the width of the open end of the locking slot is greater than the width of the root of the locking protrusion.

In some embodiments, the depth of the locking slot is greater than the height of the locking protrusion.

In some embodiments, there are a plurality of groups of locking slots, different groups of locking slots being alternately disposed in the circumferential direction, and when the first engaging portion and the second engaging portion are engaged at one of the engaging positions, the locking protrusions being in one-to-one correspondences with one group of locking slots.

In some embodiments, an included angle between axes of two locking slots corresponding to each other in the two groups of locking slots is 90°.

In some embodiments, the actuator further includes: an elastic member elastically pressed between the mounting unit and the drive unit along an axial direction of the clutch unit, so that the drive unit, the clutch unit, and the mounting unit are pressed in sequence, an elastic pre-tension force of the elastic member being used to engage the second engaging portion with the first engaging portion.

In some embodiments, the mounting unit includes: a mounting bracket, a rotating turntable, and a mounting shaft, the mounting bracket being connected to the rotating turntable, the rotating turntable being connected to the mounting shaft, the mounting bracket being configured to mount the display terminal, the rotating turntable being dynamically coupled to the first engaging portion, the mounting shaft penetrating the clutch unit and the drive unit, the elastic member being sleeved on the mounting shaft, one end of the elastic member being pressed against and fixed on an axial limiting member of the mounting shaft, and the other end being pressed against the housing of the drive unit.

In some embodiments, the other end of the elastic member is pressed against the housing of the drive unit through an elastic member end bearing.

In some embodiments, the mounting bracket is detachably mounted on the rotating turntable.

In some embodiments, the mounting shaft is integrally formed with the rotating turntable.

In some embodiments, the mounting shaft is a hollow shaft.

In some embodiments, a matching positioning mechanism is provided on the housing of the drive unit and the rotating turntable so that the display terminal is rotated by a target angle.

In some embodiments, the target angle is 90°.

In some embodiments, two limiting stops spaced apart in the circumferential direction are provided on the housing of the drive unit, and a positioning pin protruding toward the housing of the drive unit is provided on the rotating turntable, the positioning pin being adapted to be pressed against the limiting stop. The positioning mechanism includes the limiting stop and the positioning pin.

In some embodiments, an arc-shaped limiting slot is provided on the rotating turntable, and a positioning pin protruding toward the limiting slot is mounted on the housing of the drive unit, the positioning pin being adapted to be pressed against an end of the limiting slot. The positioning mechanism includes the limiting slot and the positioning pin.

In some embodiments, the drive unit includes: a power source and a speed reducer, an output shaft of the power source being connected to an input end of the speed reducer, and an output end of the speed reducer being connected to the second engaging portion.

In some embodiments, the speed reducer is a one-stage or multi-stage transmission mechanism.

In some embodiments, the speed reducer is a worm-gear transmission mechanism.

In some embodiments, the speed reducer includes a driving worm connected to the power source and a driven spur gear connected to the driving worm.

In some embodiments, the speed reducer includes: a first-stage driving worm fixedly connected to the output shaft of the power source; and a first-stage driven spur gear engaged with the first-stage driving worm and connected to second engaging portion.

In some embodiments, an included angle between an axis of the first-stage driving worm and an axis of the first-stage driven spur gear is an acute angle.

In some embodiments, the included angle between the axis of the first-stage driving worm and the axis of the first-stage driven spur gear is $\alpha$, which satisfies the following: $82° \leq \alpha \leq 88°$.

In some embodiments, the speed reducer includes: a first-stage driving worm fixedly connected to the output shaft of the power source; and a first-stage driven spur gear engaged with the first-stage driving worm; a second-stage driving worm coaxially disposed with the first-stage driven spur gear; and a second-stage driven spur gear engaged with the second-stage driving worm and connected to the second engaging portion.

In some embodiments, an included angle between an axis of the first-stage driving worm and an axis of the first-stage driven spur gear and an included angle between an axis of the second-stage driving worm and an axis of the second-stage driven spur gear both are acute angles.

In some embodiments, the included angle between the axis of the first-stage driving worm and the axis of the first-stage driven spur gear is $\alpha$, and the included angle between the axis of the second-stage driving worm and the axis of the second-stage driven spur gear is $\beta$, which satisfy the following: $82°\leq A \leq 88°$ and $82°\leq \beta \leq 88°$.

In some embodiments, the axis of the first-stage driving worm, the axis of the second-stage driven spur gear, and the axis of the clutch unit are parallel.

In some embodiments, the housing of the drive unit has an axial limiting portion, an end surface of the second-stage driven spur gear facing away from the second engaging portion being pressed against the axial limiting portion.

In some embodiments, the first-stage driven spur gear is a plastic member, and the first-stage driving worm, the second-stage driving worm, and the second-stage driven spur gear are metal members.

In some embodiments, the second-stage driven spur gear is integrally formed with the second engaging portion.

In some embodiments, the second engaging portion is made of self-lubricating materials, and the second-stage driven spur gear is made of wear-resistant materials.

In some embodiments, the housing of the drive unit includes: a housing body, the power source being mounted on the housing body; and an upper housing cover connected to the housing body, the second-stage driven spur gear being mounted on the housing body, and the upper housing cover having an axial limiting portion configured to limit an end surface of the second-stage driven spur gear.

In some embodiments, the housing body is a plastic member, and the upper housing cover is a metal member.

In some embodiments, the second-stage driven spur gear is pressed against the axial limiting portion through a gear end bearing.

In some embodiments, an annular groove is provided on the end surface of the second-stage driven spur gear, the gear end bearing being provided in the annular groove and pressed against a bottom wall of the annular groove, and at least a part of the axial limiting portion protruding into the annular groove.

In some embodiments, the upper housing cover has a shaft sleeve, and the second-stage driven spur gear is sleeved on the shaft sleeve.

In some embodiments, the housing of the drive unit further includes: a rear housing cover connected to the housing to cover a rear end of the housing; and a front housing cover connected to the housing to cover a front end of the housing.

A vehicle is provided, including: a display terminal and any of the actuators, the actuator being mounted on a vehicle body, and the display terminal being mounted on the mounting unit of the actuator.

In the description of this specification, the description of the reference terms such as "an embodiment", "some embodiments", "exemplary embodiments", "example", "specific example", or "some examples" means that the specific features, structures, materials or characteristics described with reference to the embodiment or example are included in at least one embodiment or example of the present disclosure. In this specification, schematic descriptions of the foregoing terms do not necessarily directed at the same embodiment or example. Moreover, the specific features, structures, materials, or characteristics described may be combined in any one or more embodiments or examples in an appropriate manner.

Although the embodiments of the present disclosure have been shown and described, a person of ordinary skill in the art may understand that: various changes, modifications, replacements and variations may be made to the embodiments without departing from the principles and spirit of the present disclosure, and the scope of the present disclosure is as defined by the appended claims and their equivalents.

What is claimed is:

1. An actuator for adjusting a display terminal, comprising:
   a mounting unit configured to mount a display terminal;
   a clutch unit, wherein a first engaging portion of the clutch unit is connected to the mounting unit, and a second engaging portion of the clutch unit is normally interlocked with the first engaging portion; and
   a drive unit, wherein an output end of the drive unit is connected to the second engaging portion;
   wherein the clutch unit is located outside a housing of the drive unit;
   wherein the housing of the drive unit has a radial holding mechanism, the second engaging portion is relatively rotatably disposed on the radial holding mechanism for limiting in a radial direction; and
   wherein the housing of the drive unit comprises: a housing body, an upper housing cover, and a front housing cover, the upper housing cover is connected to the housing body and has an annular sleeve, and the front housing cover is connected to a front end of the housing body and has an annular limiting ring, the limiting ring is sleeved on the sleeve to define an annular cavity, at least a part of the second engaging portion is located in the annular cavity.

2. The actuator for adjusting a display terminal according to claim 1, wherein at least a part of the clutch unit is located in the mounting unit.

3. The actuator for adjusting a display terminal according to claim 2, wherein the mounting unit comprises a rotating turntable configured to mount the display terminal and connected to the first engaging portion, wherein an end of the rotating turntable facing the first engaging portion has a first groove, at least a part of the first engaging portion and at least a part of the second engaging portion are located in the first groove.

4. The actuator for adjusting a display terminal according to claim 1, wherein the output end of the drive unit comprises an annular output gear connected to the second engaging portion and sleeved on the sleeve.

5. The actuator for adjusting a display terminal according to claim 4, wherein the second engaging portion comprises an engaging pad to be locked with the first engaging portion and a connecting sleeve connected to an end of the engaging pad facing away from the first engaging portion, the connecting sleeve is connected to the output gear, and the limiting ring is sleeved on the connecting sleeve.

6. The actuator for adjusting a display terminal according to claim 1, wherein the first engaging portion and the second engaging portion are engaged with each other and have a plurality of engaging positions, and the mounting unit is configured to be manually rotatable to drive the first engaging portion to rotatably switch between the plurality of engaging positions relative to the second engaging portion.

7. The actuator for adjusting a display terminal according to claim 6, wherein the end surfaces of the first engaging portion and the second engaging portion are opposite to each other, one of the two end surfaces facing each other has a plurality of locking slots, and the other has at least one locking protrusion, each of the locking protrusions is configured to be engaged with at least two of the locking slots so that the second engaging portion and the first engaging portion are engaged at least at two of the engaging positions.

8. The actuator for adjusting a display terminal according to claim 7, wherein the mounting unit comprises a rotating turntable configured to mount the display terminal, the end surface of the first engaging portion is configured as an end surface of the rotating turntable facing the second engaging portion, and the locking protrusion is formed on the end surface of the first engaging portion; and both the locking slot and the locking protrusion have an arc-shaped cross section.

9. The actuator for adjusting a display terminal according to claim 7, wherein at least one side of the locking protrusion is pressed against a corresponding side of the locking slot so that the locking protrusion is engaged with the locking slot.

10. The actuator for adjusting a display terminal according to claim 9, wherein a width of at least a part of the locking protrusion is greater than a width of an open end of the locking slot, a width of the locking slot gradually decreases from the open end to a bottom, a width of the locking protrusion gradually decreases from a root to a top, and the width of the open end of the locking slot is less than a width of the root of the locking protrusion; and a depth of the locking slot is less than a height of the locking protrusion.

11. The actuator for adjusting a display terminal according to claim 9, wherein the locking slot and the locking protrusion are in clearance fit in a circumferential direction, and there are a plurality of groups of locking slots, different groups of locking slots are alternately disposed in the circumferential direction, and when the first engaging portion and the second engaging portion are engaged at one of the engaging positions, the locking protrusions are in one-to-one correspondences with one group of locking slots;
the width of the open end of the locking slot is greater than the width of the root of the locking protrusion; and
the depth of the locking slot is greater than the height of the locking protrusion.

12. The actuator for adjusting a display terminal according to claim 1, wherein the actuator further comprises: an elastic member elastically pressed between the mounting unit and the drive unit along an axial direction of the clutch unit, so that the drive unit, the clutch unit, and the mounting unit are pressed in sequence, an elastic pre-tension force of the elastic member is configured to engage the second engaging portion with the first engaging portion.

13. The actuator for adjusting a display terminal according to claim 1, wherein the drive unit comprises: a power source and a speed reducer, an output shaft of the power source is connected to an input end of the speed reducer, an output end of the speed reducer is connected to the second engaging portion, and the speed reducer comprises:
a first-stage driving worm fixedly connected to the output shaft of the power source;
a first-stage driven spur gear engaged with the first-stage driving worm;
a second-stage driving worm coaxially disposed with the first-stage driven spur gear; and
a second-stage driven spur gear engaged with the second-stage driving worm and connected to the second engaging portion, wherein an included angle between an axis of the first-stage driving worm and an axis of the first-stage driven spur gear is an acute angle, and an included angle between an axis of the second-stage driving worm and an axis of the second-stage driven spur gear is an acute angle.

14. A vehicle, comprising: a display terminal and the actuator according to claim 1, wherein the actuator is mounted on a vehicle body, and the display terminal is mounted on the mounting unit of the actuator.

15. An actuator for adjusting a display terminal, comprising:
a mounting unit configured to mount a display terminal;
a clutch unit, wherein a first engaging portion of the clutch unit is connected to the mounting unit, and a second engaging portion of the clutch unit is normally interlocked with the first engaging portion; and
a drive unit, wherein an output end of the drive unit is connected to the second engaging portion;
wherein the first engaging portion and the second engaging portion are engaged with each other and have a plurality of engaging positions, and the mounting unit is configured to be manually rotatable to drive the first engaging portion to rotatably switch between the plurality of engaging positions relative to the second engaging portion; and
wherein when the engaging position is changed, the second engaging portion and the drive unit remain stationary relative to each other in the axial direction, and the first engaging portion moves away from the second engaging portion in the axial direction; and
the plurality of engaging positions are formed on end surfaces of the first engaging portion and the second engaging portion opposite to each other.

16. An actuator for adjusting a display terminal, comprising:
a mounting unit configured to mount a display terminal;
a clutch unit, wherein a first engaging portion of the clutch unit is connected to the mounting unit, and a second engaging portion of the clutch unit is normally interlocked with the first engaging portion; and
a drive unit, wherein an output end of the drive unit is connected to the second engaging portion;
wherein the actuator further comprises: an elastic member elastically pressed between the mounting unit and the drive unit along an axial direction of the clutch unit, so that the drive unit, the clutch unit, and the mounting unit are pressed in sequence, an elastic pre-tension force of the elastic member is configured to engage the second engaging portion with the first engaging portion; and
wherein the mounting unit comprises: a mounting bracket, a rotating turntable, and a mounting shaft, the mounting bracket is connected to the rotating turntable, the rotating turntable is connected to the mounting shaft, the mounting bracket is configured to mount the display terminal, the rotating turntable is dynamically coupled to the first engaging portion, the mounting shaft penetrates the clutch unit and the drive unit, the elastic member is sleeved on the mounting shaft, one end of the elastic member is pressed against and fixed on an axial limiting member of the mounting shaft, and the other end is pressed against the housing of the drive unit.

17. The actuator for adjusting a display terminal according to claim 16, wherein the housing of the drive unit and the rotating turntable are provided with a matching positioning mechanism so that the display terminal is rotated by a target angle, the positioning mechanism comprises a limiting stop and a positioning pin, two limiting stops spaced apart in the circumferential direction are disposed on the housing of the drive unit, and a positioning pin protruding toward the housing of the drive unit is disposed on the rotating turntable, the positioning pin is configured to be pressed against the limiting stop; or the positioning mechanism comprises a limiting slot and a positioning pin, an arc-shaped limiting slot is disposed on the rotating turntable, and a positioning pin protruding toward the limiting slot is mounted on the housing of the drive unit, the positioning pin is configured to be pressed against an end of the limiting slot.

* * * * *